United States Patent
Zhao et al.

(10) Patent No.: US 8,917,384 B2
(45) Date of Patent: Dec. 23, 2014

(54) PORTABLE HIGH-RESOLUTION NON-CONTACT MODULAR SENSOR FOR SURFACE STRAIN MEASUREMENT

(71) Applicant: Kansas State University Research Foundation, Manhattan, KS (US)

(72) Inventors: Weixin Zhao, Manhattan, KS (US); Burdette Terry Beck, Manhattan, KS (US); Robert Peterman, Manhattan, KS (US); Chih-Hang Wu, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 13/848,523

(22) Filed: Mar. 21, 2013

(65) Prior Publication Data

US 2013/0250278 A1 Sep. 26, 2013

Related U.S. Application Data

(60) Provisional application No. 61/613,806, filed on Mar. 21, 2012, provisional application No. 61/794,050, filed on Mar. 15, 2013.

(51) Int. Cl.
*G01B 11/16* (2006.01)

(52) U.S. Cl.
CPC .................................. *G01B 11/162* (2013.01)
USPC .......................................................... 356/32

(58) Field of Classification Search
CPC .......... G01B 11/16; G01B 11/18; G01L 1/241
See application file for complete search history.

(56) References Cited

U.S. PATENT DOCUMENTS

| | | | | |
|---|---|---|---|---|
| 4,777,358 | A | * | 10/1988 | Nelson ........................... 250/225 |
| 6,097,477 | A | * | 8/2000 | Sarrafzadeh-Khoee ..... 356/35.5 |
| 6,563,129 | B1 | * | 5/2003 | Knobel ..................... 250/559.04 |
| 7,044,680 | B2 | * | 5/2006 | Godbersen et al. ............. 404/75 |
| 2003/0175077 | A1 | * | 9/2003 | Godbersen et al. .......... 404/84.2 |
| 2009/0116697 | A1 | * | 5/2009 | Shalaby et al. ................ 382/108 |

* cited by examiner

*Primary Examiner* — Michael P Stafira
(74) *Attorney, Agent, or Firm* — Hovey Williams LLP

(57) ABSTRACT

A portable optical sensor for measuring surface strain in an object, such as pre-stressed concrete articles, is provided. The sensor is a modular device comprising at least first and second modules, each of which includes a laser and image sensor. When placed adjacent to the object, the laser of each module illuminates respective, spaced-apart areas of the object's surface and each module's image sensor captures at least a portion of the light reflected from the illuminated area and generates a speckle image of the area. Speckle images of the areas taken at various times and/or under various object stress conditions are compared to arrive at a surface strain measurement for the object.

30 Claims, 14 Drawing Sheets

PORTABLE HIGH-RESOLUTION NON-CONTACT MODULAR SENSOR FOR SURFACE STRAIN MEASUREMENT

CROSS-REFERENCE TO RELATED APPLICATION

This application claims the benefit of U.S. Provisional Patent Application No. 61/613,806, filed Mar. 21, 2012, and U.S. Provisional Patent Application No. 61/794,050, filed Mar. 15, 2013, both of which are incorporated by reference herein in their entireties.

BACKGROUND OF THE INVENTION

1. Field of the Invention

The present invention is directed toward a modular sensor configured to measure the surface strain of an object. The sensor generally comprises two spaced-apart modules, each module having a laser operable to illuminate an area on the surface of the object and an imaging sensor for capturing at least a portion of the light reflected by the respective area and generating speckle images of the area. Speckle images of substantially the same areas on the surface of the object taken at different times, and/or under different object stress conditions, can be compared and the surface strain determined.

2. Description of the Prior Art

The ability to measure surface strain of an object is important to several diverse engineering, architectural, and/or scientific fields. For example, in order to design and build civil infrastructures of extended lifetime without compromising the safety or increased cost, or to effectively qualify their performance in terms of safety, it is necessary to collect the information about the structure performance, either at time of construction or at the time of service. One of the factors that is used to evaluate the performance of structural object, such as a concrete object, is the stress or strain information of the member. For example, bridge health evaluation usually is performed through measurement of the in situ strain of the bridge in response to traffic flow.

One current technique used for measuring surface strain of an object, such as a concrete structure, is a mechanical strain gauge called the Whittemore gauge. Prior to measuring the strain with the gauge, small steel circular buttons with a precision pinhole at the center, called "points," are bonded on the concrete surface using epoxy. The Whittemore gauge then measures the distance between the pinholes of successive pairs of points. Prior to the surface deformation, a set of reference length measurement are made, representing the unstrained positions of the points. Then a second measurement is taken after the surface deformation. Using the gauge length of the Whittemore gauge, e.g., 203.2 mm (8 inches), and the difference between the second measurement and the reference length, the concrete surface strain can be measured. While the Whittemore gauge, can provide a surface strain measurement of an object it has a relatively low resolution of 0.0025 mm (0.0001 inches). When a reasonable strain profile is required, tens of points must be bonded onto the concrete surface, which is very time consuming and labor-intensive. Furthermore, the measurement results are heavily influenced by the users' habits and skills.

Therefore, there is a need for sensors that can accurately and efficiently measure surface strain of an object, offer flexibility for use in various environments and for various types of measurements, and that can be used by technicians having minimal levels of experience with sophisticated sensor technology.

SUMMARY OF THE INVENTION

According to one embodiment of the present invention, there is provided an optical strain sensor for detecting strain in an object, such as a pre-stressed concrete article. The sensor generally comprises a first and second modules interconnected by one or more members configured to fix the length between the first and second modules. The first module comprises a first laser and a first image sensor, and the second module comprises a second laser and a second image sensor. The first and second modules are configured to illuminate respective first and second areas on the surface of the object and to capture at least a portion of the light reflected off the first and second areas as respective speckle images. In particular embodiments, the image sensors comprise CCD cameras and the lasers comprise laser diodes. The one or more members interconnecting the first and second modules assist in defining a gauge length that corresponds with the distance between the first and second areas of the object's surface.

According to another embodiment of the present invention, there is provided a method of sensing strain in an object. Generally, the method comprises placing an optical strain sensor made in accordance with the present invention described herein adjacent to an object so that an optical strain measurement can be taken. The optical strain sensor is then used to illuminate a first area and a second area on a surface of the object and to capture at least a portion of light emitted from the sensor and reflected off the object thereby generating an initial speckle image of the first area and an initial speckle image of the second area. The initial speckle images are generally representative of a first condition of the object. After passage of a predetermined length of time, the same or a similarly constructed optical strain sensor according to the present invention is then used to re-illuminate the first and second areas of the surface of the object and capture at least a portion of light emitted from the sensor and reflected off the object thereby generating a second speckle image of the first area and a second speckle image of the second area. The second speckle images are generally representative of a second condition of the object. The initial speckle images are then compared to the second speckle images to determine a strain measurement.

DETAILED DESCRIPTION OF THE PREFERRED EMBODIMENT

The following detailed description of the invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
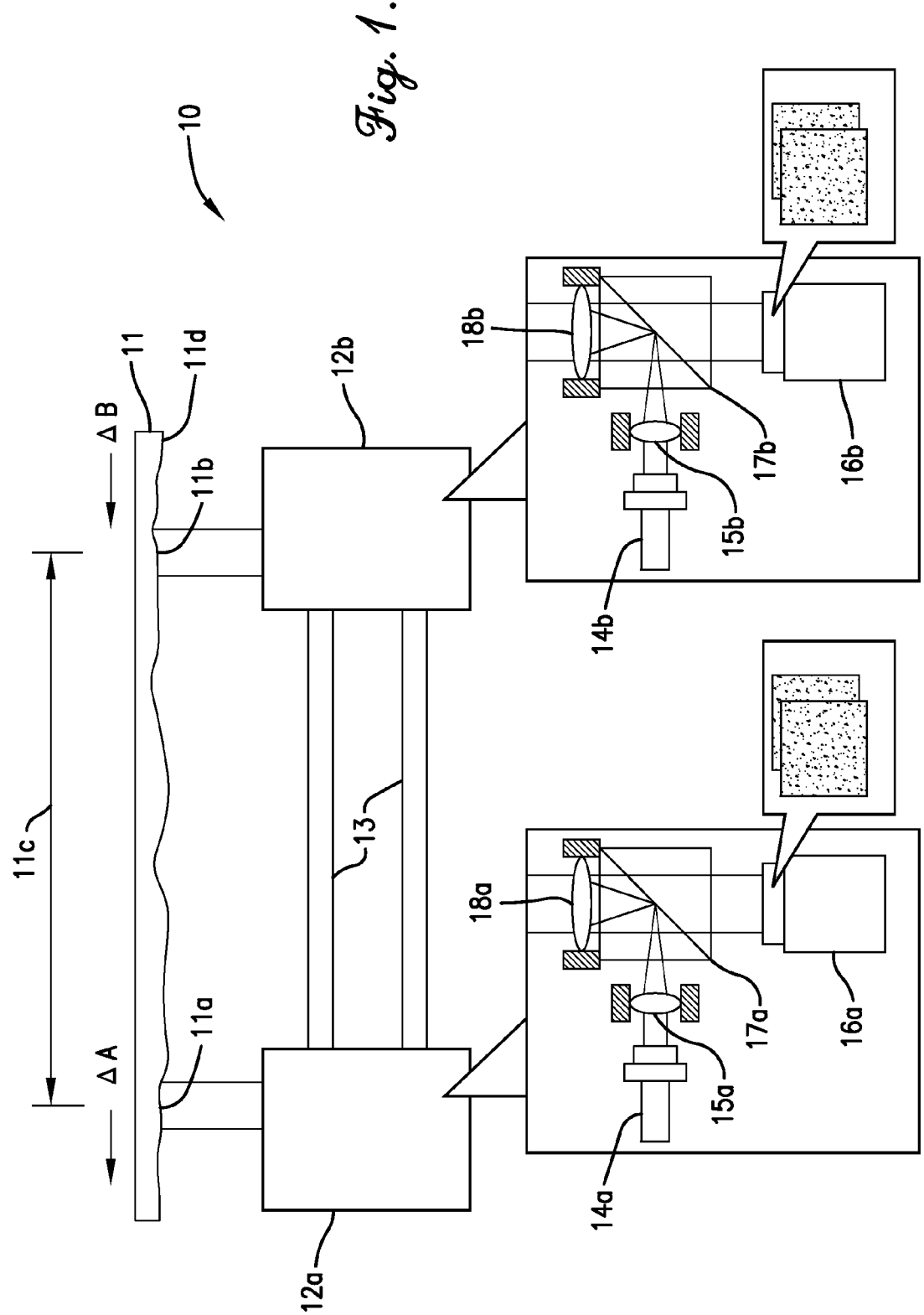
FIG. 1 is a schematic depiction of a dual-module sensor according to one embodiment of the present invention.

Various embodiments of the present invention concern an optical strain sensor that includes at least two separate modules. In the embodiment depicted in FIG. 1, the optical strain sensor 10 includes first and second modules 12a and 12b, respectively, interconnected by one or more members 13. In certain embodiments, the first and second modules 12a and 12b, respectively, can comprise identical or similar components. For example, the embodiment depicted in FIG. 1 illustrates that each module can comprise a first laser 14a, a first image sensor 16a, a first beam splitter 17a, and first lenses 15a and 18a. The following description of the aforementioned components can, in certain embodiments, apply to the respective components of the first and second module 12a and 12b, respectively.

The first and second lasers 14a and 14b, respectively, can comprise any type of laser capable of emitting coherent light, such as, a laser diode. In certain embodiments, the laser 14a is configured to emit light having a wavelength of 632.8 nanometers at a power rating of 5 mW. In one or more embodiments, the laser 14a can emit light at any wavelength that can be detected by the image sensor 16a. For example, the laser 14a can emit green light having a wavelength of about 532 nm. In one or more embodiments, the laser 14a can be a compact laser diode module that comprises a laser diode circuit, collimating lens, and the drive circuit packaged in a metal or plastic housing. The laser diode circuit and drive circuit can be any configuration known to those skilled in the art.

In preferred embodiments, the laser beam intensity profile of the laser 14a can have a Gaussian shape. A Gaussian profile beam will remain Gaussian along its path of propagation through the optical system. Thus, the propagation of Gaussian beams through an optical system can be treated almost as simply as geometric optics. Experiments have shown that lasers 14a used in accordance with certain embodiments of the present invention have a beam profile close to Gaussian shape (TEM00 mode shape).

In certain embodiments, operation of the components of module 12a can generate and dissipate heat, which can affect the operation of the laser 14a. In one or more embodiments, the laser beam of the laser 14a does not significantly drift as the temperature changes. For example, in various embodiments, the laser 14a can have a laser pointing stability of less than 100 μrad/° C., 50 μrad/° C., 25 μrad/° C., or 15 μrad/° C. In one or more embodiments, the laser 14a can be a high performance diode laser from the Diode Laser Concept Company having a laser pointing stability of approximately 10 μrad/° C. In certain embodiments, the laser pointing stability of a laser 14a used in accordance with the present invention exhibited a laser pointing stability of approximately 11.4 μrad/° C.

In certain embodiments, the collimating lens of the laser 14a can be any lens capable of circularizing the light emitted from a laser diode and/or removing astigmatism. In one or more embodiments, the collimating lens can be aspherical. In certain embodiments, the collimating lens can be made of any material that can effectively function in a harsh environment where the ambient temperature can fluctuate tens of degrees while minimizing the effect of temperature change on the performance of the optical strain sensor 10. In various embodiments, the collimating lens is made of a material that exhibits a thermal expansion of less than 300 ppm/° C., 150 ppm/° C., 50 ppm/° C., 10 ppm/° C., or 1 ppm/° C. In certain embodiments, the collimating lens material can include glass, such as, NBK7, a borosilicate crown optical glass. In one or more embodiments, the collimating lens material can include a less expensive plastic material. However, it is also within the scope of the present invention for the collimating lens material to not include an acrylic and/or plastic material.

In certain embodiments, the optical strain sensor 10 is configured to emit a collimated laser light of 10 mm in diameter toward a surface of an object 11. For example, in certain embodiments, the optical strain sensor 10, and particularly lens 15a, a beam splitter 17a, and a lens 18a, can direct a collimated laser light of 10 mm in diameter to an object's surface. In certain embodiments, the lens 15a, the beam splitter 17a, and/or the lens 18 can comprise a NBK7 borosilicate glass material, or other equivalent material known to one skilled in the art.

Figure 2:
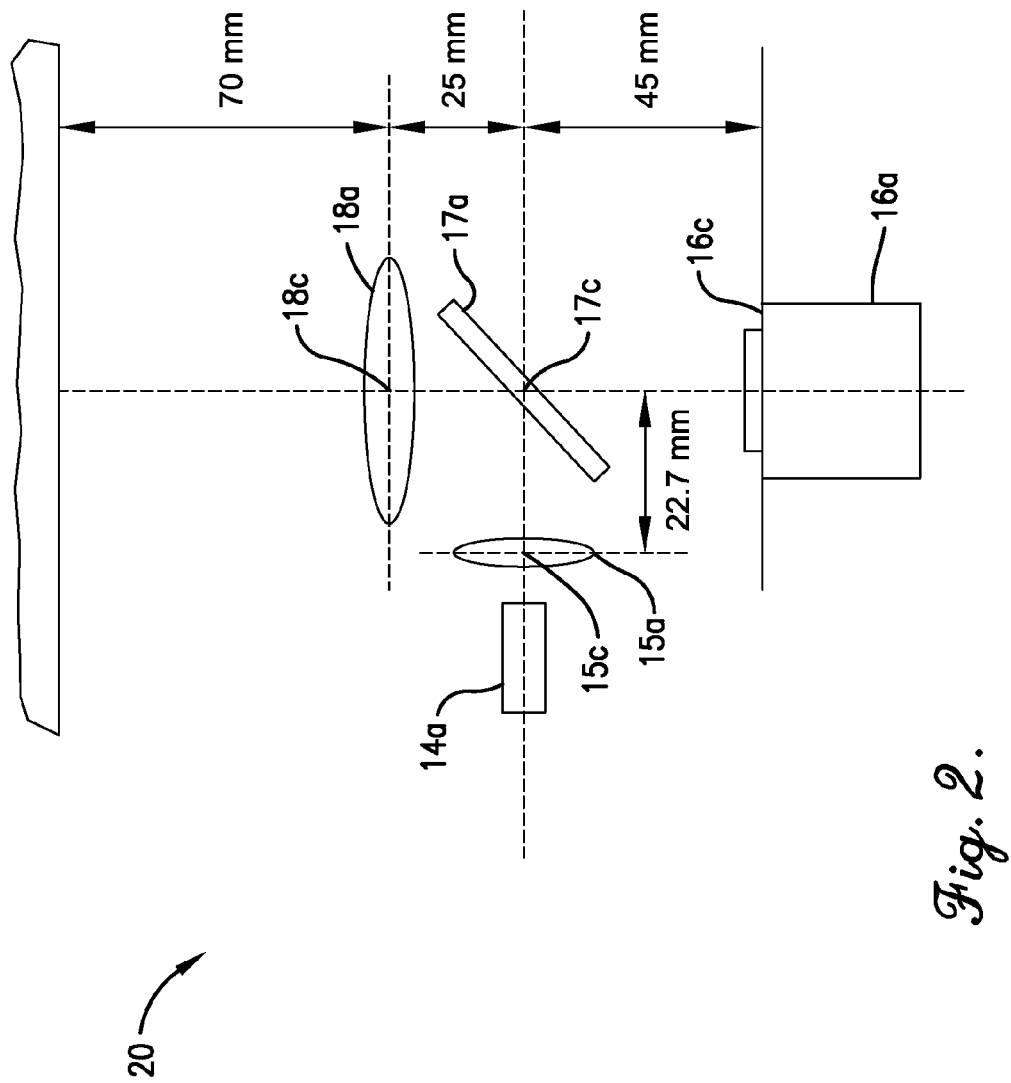
FIG. 2 is a schematic depiction of an exemplary module used in sensors according to the present invention.

In certain embodiments, the lens 15a can expand at least a portion of the laser light emitted by the laser 14a. In one or more embodiments, the lens 15a can have a focal length of approximately 15 mm and a diameter of approximately 12 mm. In a preferred embodiment, the lens 15a can be a Plano-convex 12.7 mm diameter, 15.0 mm focal length with a VIS 0° coating, or other equivalent lens known to one skilled in the art. In one or more embodiments, the lens 15a can be positioned between the laser 14a and the beam splitter 17a. For example, as seen in the embodiment depicted in FIG. 2, the center 15c of the lens 15a is approximately 22.7 mm from the center 17c of the beam splitter 17a and towards the laser 14a.

As noted above, in certain embodiments, the optical strain sensor 10 can include a beam splitter 17a operable to split light emitted by the laser 14a prior to illumination of the first area 11a. In various embodiments, the beam splitter 17a can have a reflection/transmission ratio of 50R/50T. In certain embodiments, the beam splitter 17a can be a C-mounted plate beam splitter 50R/50T with a visible coating, or equivalent beam splitter known to one skilled in the art. In one or more embodiment, the beam splitter 17a can be positioned adjacent the lens 15a and opposite the laser 14a. In certain embodiments, the beam splitter 17a can be positioned between the CCD camera 16a and the lens 18a. As best seen in the embodiment depicted in FIG. 2, the beam splitter 17a is positioned between the image sensor 16a and the lens 18a, with the center 17c of the beam splitter 17a positioned approximately 45 mm from the front face 16c of the housing of the image sensor 16, and approximately 25 mm from the center 18c of the lens 18a.

In certain embodiments, the lens 18a can expand at least a portion of the light emitted by the laser 14a. In various embodiments, the lens 18a can serve two purposes in the optical strain sensor 10: collimating the laser light, and imaging the reflected speckle pattern to the image sensor 16a. In one or more embodiments, the lens 18a can have a focal length of approximately 40 mm and a diameter of approximately 20 mm. In a preferred embodiment, the lens 18a can be a double convex lens with a 20 mm diameter and a 40 mm focal length having a VIS 0° coating, or other equivalent lens known to one skilled in the art. In certain other embodiments, the lens 18a can be a triplet lens that comprises three single lenses, e.g., one convex lens and two concave lenses. In such embodiments, the positive aberration from the convex lens and the negative aberration from the concave lens are cancelled out thereby reducing the distortion of the imaging system. In certain embodiments, the lens 18a can be positioned adjacent the beam splitter 17a and opposite the image sensor 16a.

In certain embodiments, the image sensor can be any sensor capable of capturing light emitted from a laser and reflected off the surface of an object. In certain embodiments, each of the first and second image sensors 16a and 16b can be a CCD sensor or other sensor array known in the art. In various embodiments, the image sensors 16a and 16b can be CCD cameras. In one or more embodiments, the CCD camera can be compact, exhibit low power consumption, and/or exhibit low levels of noise. In certain embodiments, the CCD camera can be monochrome Lu130M CCD camera with a resolution of 1392×1040 pixels powered by 5V DC current and consuming 4 watts of power, or other comparable CCD camera. However, it is within the scope of the present invention for the sensors to have even greater resolution than 1392× 1040 pixels in order to provide a desired level of resolution and image quality.

In one or more embodiments, the modules 12a and 12b are configured to simultaneously capture speckle images of the areas 11a and 11b. For example, in various embodiments, where the image sensors 16a and 16b are CCD cameras, the optical strain sensor 10 can include a global shutter feature for the CCD cameras 16a and 16b so that all the optodetectors start and stop exposing at the same time, which eliminates at least a portion of the potential error associated with any surface motion during the exposure period of the camera thereby reducing error in the strain measurement. Any global shutter feature known to one skilled in the art can be used as long as such global shutter feature can eliminate at least a portion of potential error associated with any surface motion during the exposure period of the CCD camera.

In one or more embodiments, where the image sensors 16a and 16b are CCD cameras, the CCD cameras can exhibit a fast image capturing speed to minimize blur in the image. For example, in certain embodiments, the CCD cameras 16a and 16b can have an imaging capture speed at least about 1 frame per second, 20 frames per second, 100 frames per second, 1000 frames per second, 10,000 frames per second, or 100,000 frames per second.

In certain embodiments where the image sensors 16a and 16b are CCD cameras, the CCD cameras each can include adjustable shutters to control the intensity of captured image. In one or more embodiments, the adjustable shutters can at least partly enable the sensor to work in different ambient light conditions including daylight, indoor light, and/or night. Any adjustable shutters known to one skilled in the art can be used as long as the adjustable shutters can enable the sensor to adjust the intensity of the captured image according to the surface reflectivity property of the specimen surface 11.

Figure 3:
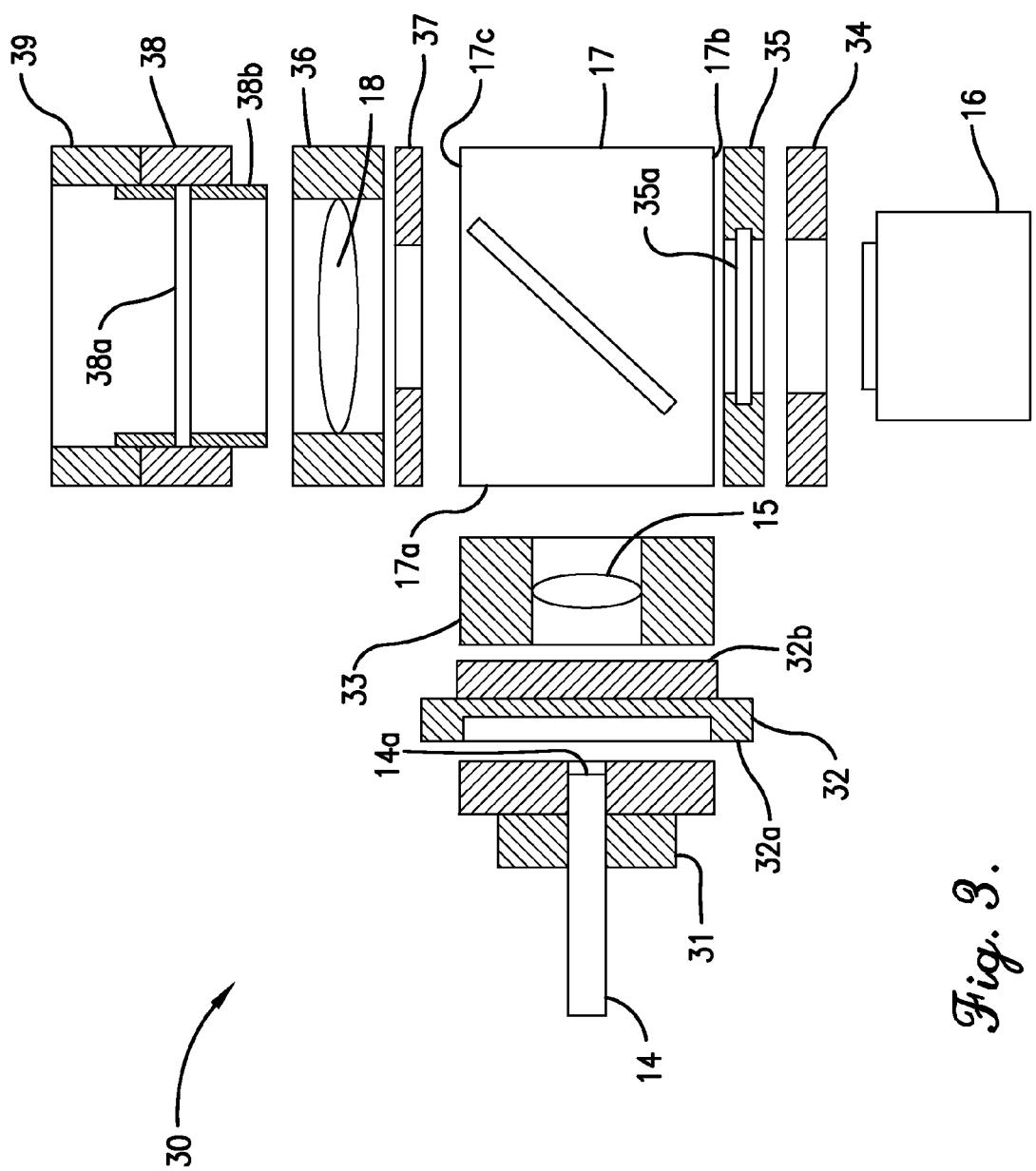
FIG. 3 is a detailed schematic view of an exemplary module used in sensors according to the present invention.

FIG. 3 depicts a detailed schematic diagram of the components of a module 30 for the optical strain sensors in accordance with the present invention, particularly illustrating the mounting components. It should be understood that the specific components and arrangement of components depicted in FIG. 3 are exemplary and any number of changes can be made to the components and/or arrangement of components by one skilled in the art.

The module 30 of FIG. 3 includes a laser 14, image sensor 16, and two lenses 15 and 18. In certain embodiments, the aforementioned components of the module 30 can have the same properties and characteristics as the respective components of the optical strain sensor 10 discussed above with reference to FIG. 1. In certain embodiments, the module 30 includes a Ø9.5 mm collimator adapter 31 having external SM1 threads facing away from the laser 14. In such embodiments, the adapter 31 is coupled to the laser 14, particularly at the light emitting end 14a of the laser 14. Further, the adapter 31 is coupled to another adapter 32 having internal SM1 threads on the face 32a adjacent the adapter 31 and external C-mount threads on the face 32b opposite the face 32a. In particular embodiments, the adapter 32 can be coupled to a C-mount 12.5 mm thick lens mount 33 housing a plano convex 12.7 diameter, 15 mm focal length VIS 0 coated lens 15 therein. The lens mount 33 is coupled to the face 17a of a C-mount beam 50R/50T beam splitter 17. Additionally, in such embodiments, an image sensor 16 is coupled to a male C-mount double male rotating barrel 34. The rotating barrel 34 is coupled to a C-mount 15 mm lens mount 35 housing a 15 mm diameter unmounted linear glass polarizing filter 35a. The lens mount 35 is coupled to the face 17b of the beam splitter 17. Further, a C-mount 10 mm thin lens mount 37 is coupled to the face 17c of the beam splitter 17. The lens mount 37 is coupled to a C-mount 20 mm thick lens mount 36 housing a 20 mm diameter, 40 mm focal length VIS 0 coated double convex lens 18. The lens mount 37 is coupled, via a brass spacing ring kit 38b, to a C-mount thins lens mount 38 housing a TECHSPEC® high efficiency anti-reflection coated windows 38a. Further, a C-mount 10 mm length extension tube 39 is coupled to the lens mount 38 opposite the brass spacer ring lit 38b. In certain embodiments, any variations on the aforementioned components can be made with other similar functioning components known to one skilled in the art.

In certain embodiments, the first and second modules 12a and 12b, respectively, can be configured identically, or the internal components can be arranged as mirror images (i.e., right hand and left hand configurations). For example, in the embodiment depicted in FIG. 1, the first and second modules 12a and 12b are substantially identical in that the light from lasers 14a and 14b are directed toward beam splitters 17a and 17b from the same direction. However, it is within the scope of the present invention for the first and second modules 12a and 12b to be configured as mirror images of each other; that is the light from lasers 14a and 14b are directed toward their respective beam splitters in opposite directions.

In certain embodiments, the first laser 14a, the first image sensor 16a, and the first beam splitter 17a can be rigidly coupled so that their relative positions are fixed within the first module 12a, and similarly, the second laser 14b, the second image sensor 16b, and the second beam splitter 17b can be rigidly coupled so that their relative positions are fixed within the second module 12b.

Returning to FIG. 1, the optical strain sensor 10 comprises one or more members 13 interconnecting the first and second modules 12a and 12b. It is noted that members 13 are depicted schematically, and could in practice assume any form or geometry, so long as they were capable of fixing the length between modules 12a and 12b. In certain embodiments, the one or more members 13 interconnecting the first and second modules 12a and 12b are configured to fix the length between the first and second modules 12a and 12b and define a gauge length 11c corresponding to the distance between a first and second area 11a and 11b of the object surface 11d that is illuminated by the laser light from the modules. In certain embodiments, the one or more members 13 interconnecting the first and second modules 12a and 12b are configured to permit adjustment of the length between the modules, thereby altering the gauge length 11c. In such embodiments, adjustment of the length between first and second modules 12a and 12b can be achieved through any means known to those of skill in the art, such as some type of fastener or clamp. In particular embodiments, members 13 may comprise rods or bars upon which modules 12a and 12b are slidably received, but can be locked into the desired position.

To reduce error that may be introduced through thermal expansion effects, the one or more members 13 may be constructed from a material having a thermal expansion coefficient less than $7.3\times10^{-6}$ in./in./° F. (steel), less than $3.65\times10^{-6}$ in./in./° F., less than $1.825\times10^{-6}$ in./in./° F., less than $9.1\times10^{-7}$ in./in./° F., or less than $7.3\times10^{-7}$ in./in./° F. In certain embodiments, the one or more members 13 interconnecting the first and second modules 12a and 12b, respectively, can comprise a carbon fiber material and/or an invar material. In a preferred embodiment, the one or more members 13 interconnecting the first and second modules 12a and 12b can comprise carbon fiber rods. It is also within the scope of the present invention for modules 12a and 12b to be secured to a substrate (not shown), for example, an aluminum base plate, which is in turn coupled to the one or more members 13.

In certain embodiments, where it is desirable to compensate for temperature-based expansion of an object being measured, the one or more members 13 can comprise a material that can expand as the temperature changes. For example, in certain embodiments, when using an optical strain sensor 10 in a field application, e.g., on a concrete bridge structure, the surface of the concrete can expand at different temperatures, so by utilizing one or more members 13 that also expand at different temperatures one can at least partially correct for these extraneous thermal expansion effects and thereby measure the strain changes (e.g., crack expansion on bridge structure) over time. In such embodiments, the one or more members 13 can comprise a material that has a similar thermal expansion coefficient as the object being measured. For example, in such embodiments, one can use members 13 comprising steel, which has a similar thermal expansion coefficient to that of concrete. In one or more embodiments, the one or more members 13 can comprise more than one material. In certain embodiments, the optical strain sensor can have more than two modules. For example, an optical strain sensor made in accordance with the present invention can comprise a plurality of modules (e.g., three, four, or more modules) arranged in any number of geometric configurations. In such embodiments, the plurality of modules may comprise the same or similar internal structure, or their configurations can be quite different. One skilled in the art can utilize any number of modules as may be beneficial for a particular application.

Figure 4:
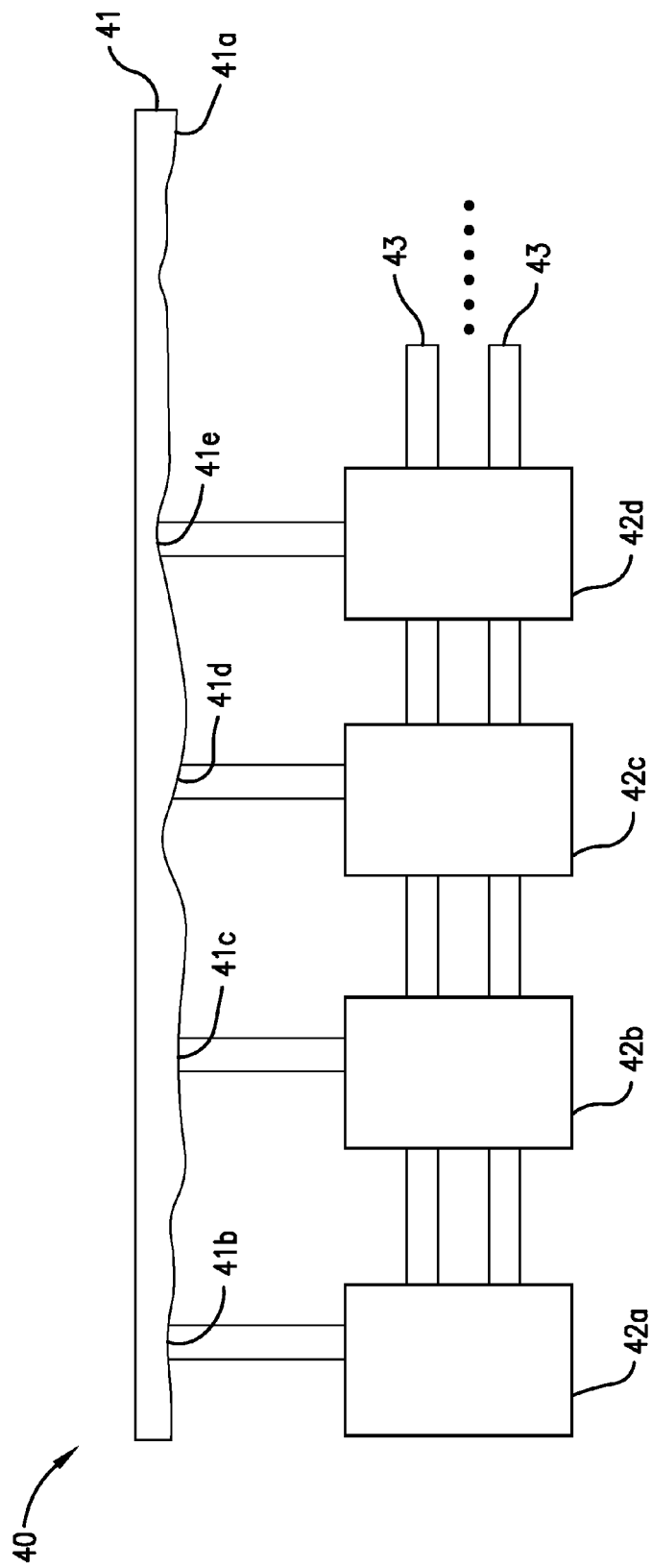
FIG. 4 is a schematic diagram of a modular sensor configuration according to another embodiment of the present invention, in which the modules are arranged in a co-linear configuration.

In particular embodiments, such as illustrated in FIG. 4, the optical strain sensor may comprise a plurality of modules that are arranged in a substantially co-linear configuration. As depicted in FIG. 4, the optical strain sensor 40 includes four modules 42a-d arranged in substantially co-linear configuration and interconnected via members 43. Modules 42a-d can be configured in the same manner as modules 12a and 12b discussed above, and are operable to illuminate respective areas 41b-e of surface 41a, and capture light reflected therefrom and generate speckle images of the same. In such embodiments, the optical strain sensor 40 allows for multiple strain measurements along the surface 41a of the object 41 at the same time, for example, by the use of a global shutter. Thus, the surface strain determination can be based upon comparison of speckle images taken of any two of areas 41b-e. For example a strain measurement can be determined by comparing areas 41b and 41c, 41c and 41d, or 41d and 41e.

Figure 5:
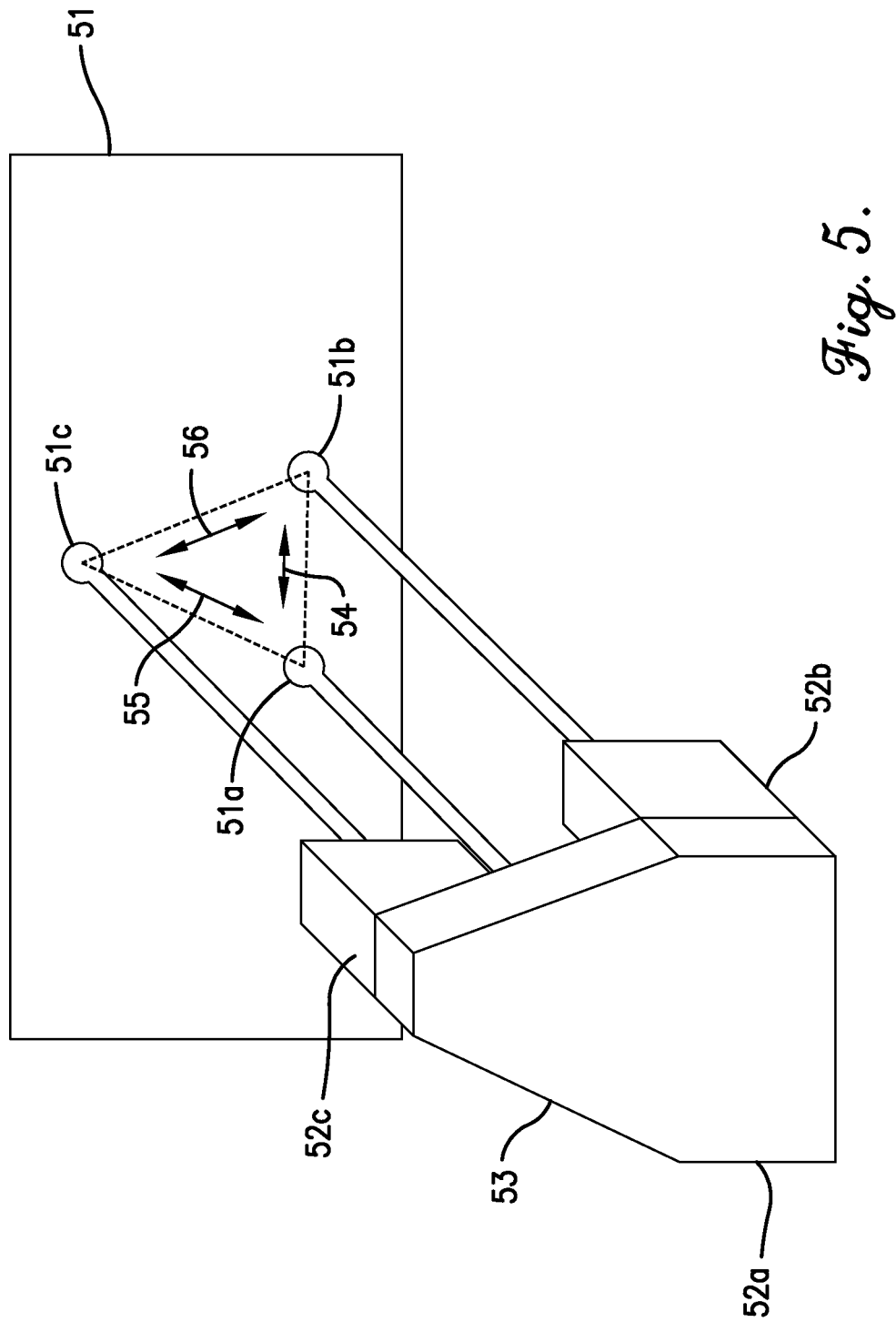
FIG. 5 is a schematic diagram of a modular sensor configuration according to still another embodiment of the present invention, in which the modules are arranged in a Rosette pattern configured to permit the sensor to take two-dimensional strain measurements.

In one or more embodiments, an optical strain sensor in accordance with the present invention can comprise a plurality of modules arranged in a geometrical configuration that permits measurement of 2-dimensional strain in an object. As shown in the embodiment depicted FIG. 5, a first and second module 52a and 52b, respectively, can be arranged horizontally to one another, with module 52a illuminating area 51a on the surface of the object 51, and module 52b illuminating area 51b, thereby permitting a strain measurement to be determined along a horizontal direction 54 through comparison of respective speckle images corresponding to areas 51a and 51b. A third module 52c can be positioned above and in between the first and second modules 52a and 52b, thereby forming a triangular or rosette geometric configuration. Module 52c can illuminate an area 51c and generate a speckle image thereof, thereby permitting strain to be determined along the direction of arrows 55 and 56. The first, second, and third modules 52a, 52b, and 53c, respectively, can be coupled together and have their respective locations fixed relative to each other via a member 53. Member 53 can have the same characteristics and properties and the one or more members 13 discussed above with respect to FIG. 1.

Figure 6:
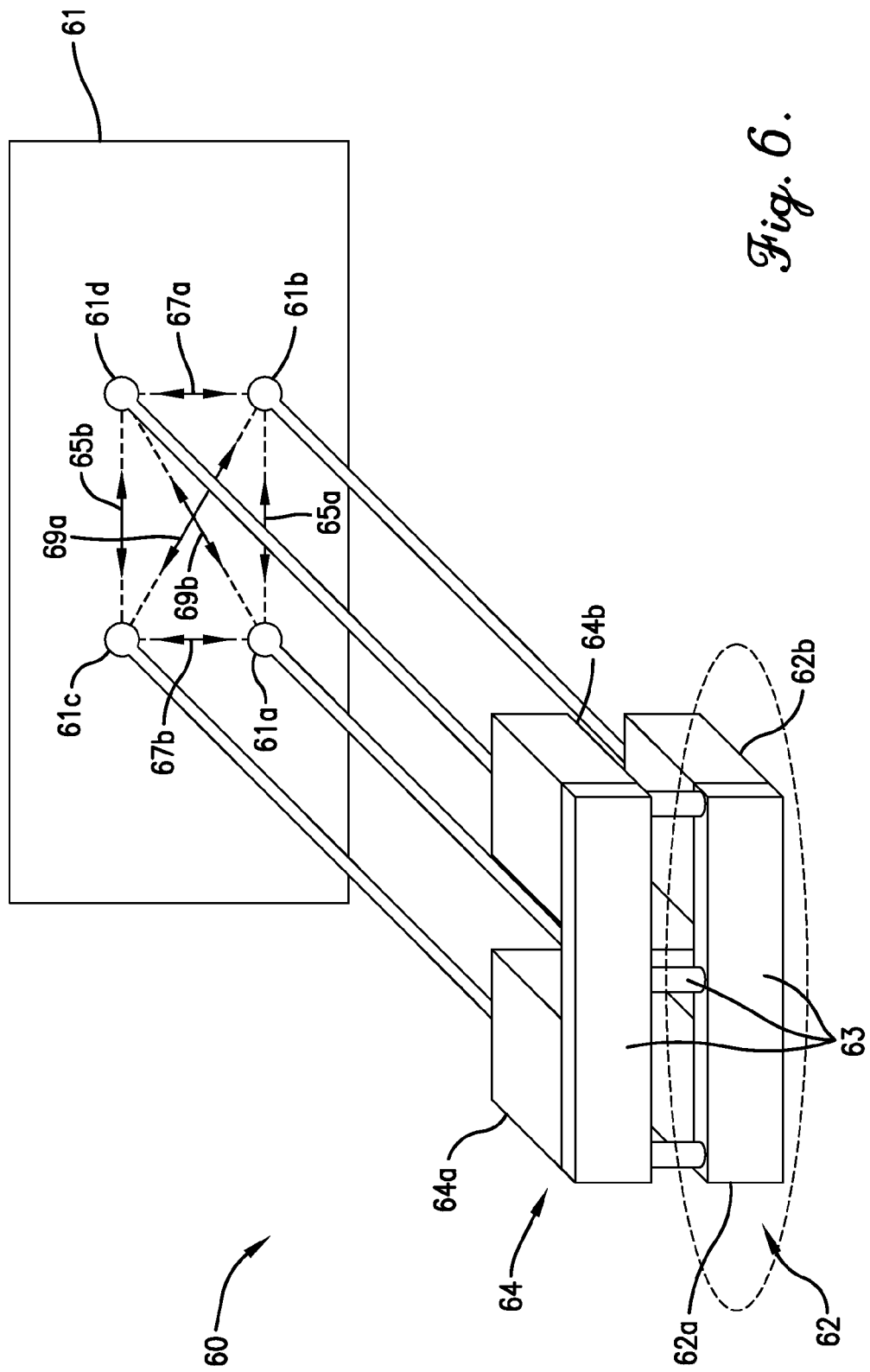
FIG. 6 is a schematic diagram of a modular sensor configuration according to yet another embodiment of the present invention, in which the modules are arranged as a stacked pair of module assemblies.

In certain embodiments, an optical strain sensor in accordance with the present invention can be arranged in a stacked configuration that can be configured for bi-axial strain measurements. For example, in the embodiment depicted in FIG. 6, the optical strain sensor 60 can include first and second sensor modules 62a and 62b, respectively, that can comprise a first dual-strain module assembly 62, and third and fourth modules 64a and 64b, respectively, that can comprise a second dual-strain module assembly 64. In such embodiments, the first assembly 62 can be stacked on top of the second assembly 64 such that the first module 62a is positioned directly above said third module 64a, and said second module 62b is positioned directly above said fourth module 64b. The first and second assemblies 62 and 64, respectively, can include all or some of the characteristics detailed above with respect to the optical strain sensor 10 of FIG. 1. For example, each individual module can be configured to illuminate an area on a surface of an object 61 and capture at least a portion of light reflected off that area as a speckle image of that area. In such embodiments, the speckle images can be captured synchronously at all modules, for example, by the use of a global shutter. Further, the first and second assemblies 62 and 64, respectively, can comprise substantially equivalent gauge lengths. In such embodiments, the first and second assemblies 62 and 64, respectively, can be coupled together by members 63. The member 63 can have the same characteristics and properties and the member 13 discussed above with respect to FIG. 1. With sensor 60, surface strain can be determined between any two of the areas 61a, 62a, 63a, and 64a of the surface of the object 61 thereby allowing strain measurement determinations in any of the following directions: along arrow 67b between areas 61a and 61c, along arrow 67a between areas 61b and 61d, along arrow 65a between areas 61a and 61b, along arrow 65b between areas 61c and 61d, along arrow 69a between areas 61b and 61c, and along arrow 69b between areas 61a and 61d.

Figure 8:
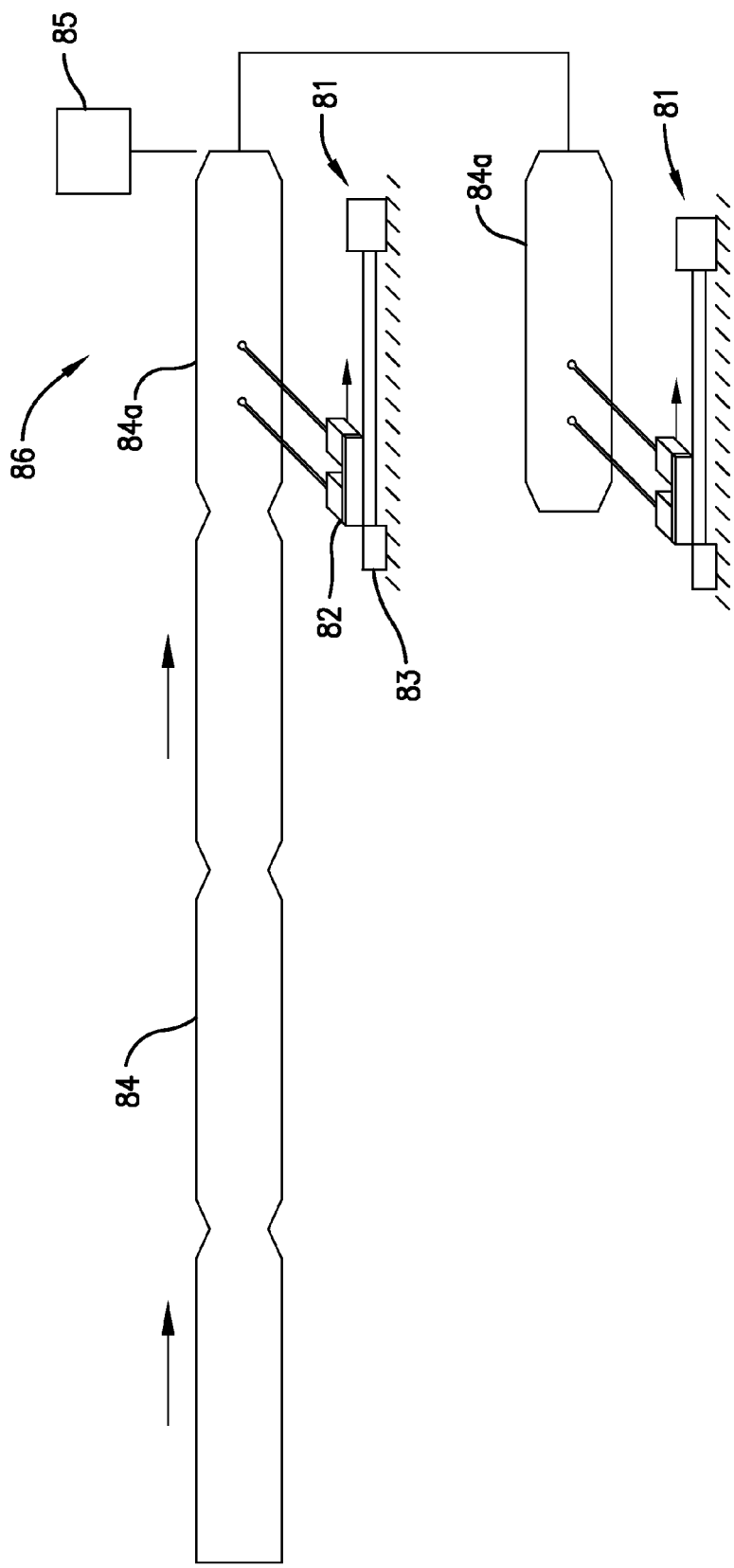
FIG. 8 is a schematic diagram of an automated sensor system in accordance with another embodiment of the present invention, in which a modular sensor is mounted on a linear traverse, the automated sensor system is positioned adjacent a tie cutting operation.

In certain embodiments, an optical strain sensor according to the present invention can be shiftably mounted upon a linear traverse to permit translatory movement of the modules while the gauge length remains fixed. For example, as discussed in more detail below, the optical strain sensor 82 of FIG. 8 is shiftably mounted onto a linear traverse 83 thereby permitting translatory movement of the strain sensor 82. Any linear traverse system known by one skilled in the art can used, and a specific linear traverse system can be chosen by one skilled in the art for a particular purpose. In particular embodiments, however, the linear traverse may comprise a rail assembly or any other structure to which the sensor can be attached and shifted while attached thereto.

In one or more sensor embodiments, the modules can be located and/or enclosed within a housing to facilitate easier handling of the sensor (e.g., in the case of a handheld device) and for enhanced protection of the module components from damage or external forces and conditions that might affect module calibration. For example, with the embodiment depicted in FIG. 7, the first and second modules, 74a and 74b, respectively, and one or more members 75, can be provided within a housing 76. The housing 76 may comprise any suitable material known to those of skill in the art, such as plastic or metal, so long as the material does not interfere with module operation. As noted above, it is within the scope of the present invention for the optical strain sensor to comprise a portable, handheld device.

As mentioned above, in certain embodiments, each module, for example, modules 12a and 12b of the optical strains sensor 10 of FIG. 1, can illuminate a surface 11d of an object 11. The object 11 can be any object 11 that is capable of experiencing deformation as a result of exposure to various internal and external stresses. As discussed in detail below, the optical strain sensor 10 utilizes laser speckle technology in the strain measurement operation, and therefore, any object that is capable of measurement using laser speckle technology can be used in accordance with the present invention. In certain embodiments, the object can comprise concrete (e.g., prestressed concrete railroad ties), steel, fiberglass and/or carbon fiber. Generally, laser speckle imaging is most effective when used in connection with an object having a surface of a certain texture or roughness. However, should it be desired to utilize a strain sensor made in accordance with the present invention in determining surface strain of an object with a relatively smooth surface, a material may be applied to the target surface in order to enhance the roughness thereof (i.e., produce a more uneven surface), thereby assisting in acquisition of a suitable speckle image of the surface. For example, in certain embodiments, the material for application to the surface may comprise microscopic reflective particles. In other embodiments, the material may comprise a paint or other coating having solid particles suspended therein.

A detailed description of the theoretical background of a laser speckle strain measurement using an optical sensor in accordance with the present invention is described in the Ph.D. thesis by Dr. Weixin Zhao entitled "Development of a Portable Optical Strain Sensor With Applications to Diagnostic Testing of Prestressed Concrete," May 2011, Kansas State University, Manhattan, Kans., USA, incorporated by reference herein in its entirety. Briefly, however, a speckle image is generated by illuminating a rough surface with coherent light. The random reflected waves interfere with each other (constructively and destructively), resulting in a grainy image of dark and light spots. The speckle pattern could be considered a "fingerprint" of the illuminated area in the sense that the speckle pattern produced by every surface area is unique. Furthermore, when the surface area undergoes movement or deformation, the speckle pattern in the image plane will also move or deform accordingly. Further, since only the in-plane displacement components (X, Y displacements) are of interest in the measurement of surface strain, the optical strain sensor in accordance with the present invention can measure the in-plane displacement components of two nearby surface points on the object surface by detecting the speckle shifts at the corresponding "translation-only" planes only while being insensitive to any surface motion other than the in-plane displacement.

Figure 7:
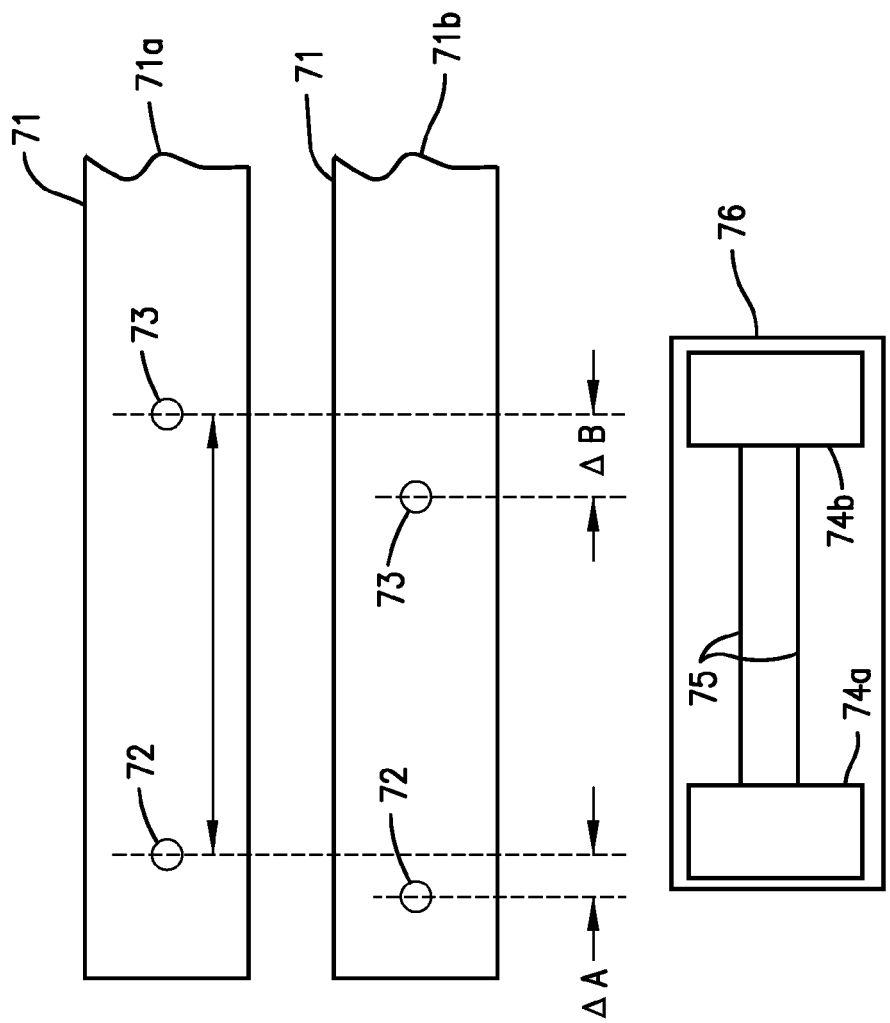
FIG. 7 is a schematic diagram of a modular sensor according to one embodiment of the present invention, particularly showing two modules and a member inside a housing material, the modular sensor is adjacent an object illustrated in two conditions where areas on the object have shifted in the second condition relative to the areas in the first condition.

During measurement of an object presenting an initial condition (e.g., an initial stress condition), such as object 71a of FIG. 7, an optical strain sensor in accordance with the present invention is positioned on or near the surface of the object (generally 71). Light is emitted from the two modules 74a and 74b, with one laser emitting light that is directed toward a first area 72 and another laser emitting light that is directed toward a second area 73 on the surface of the object 71. The light is reflected off the areas and towards the modules so that one image sensor can capture a speckle image of area 72 and another image sensor can capture a speckle image of area 73.

In order to perform the strain calculation, second speckle images of the areas 72 and 73 must be generated, preferably when the object 71 presents a second condition that is different from the initial condition. The object in this second condition is denoted as 71b. In certain embodiments, the first and second conditions 71a and 71b, respectively, of the object 71 can comprise different stress conditions. For example, the first condition 71a of the object 71 can comprise a condition in which the object 71 is subjected to stress, and the second condition 71b of the object 71 comprises a condition in which the stress has been reduced. In certain embodiments, the object 71 can be a pre-stressed concrete article that, when in a first condition 71a, is experiencing application of tensile forces, and when in a second condition 71b, at least a portion of those tensile forces have been reduced. In certain other embodiments, object 71a comprises a pre-tensioned concrete railroad crosstie, and object 71b comprises the concrete railroad crosstie after de-tensioning. In practical applications, speckle images of the respective areas 72 and 73 can be taken over any time period. Additionally, continuously generated speckle images may be generated for real time surface strain monitoring for dynamic loading structures, such as a bridge.

In certain embodiments, the speckle images to be compared may be acquired at significantly different times. In such embodiments, the sensor can be removed or separated from the object 71 following generation of the initial set of speckle images. After passage of the desired length of time, the same sensor or a different sensor made in accordance with the present invention can again be placed adjacent the object 71 so that a second set of speckle images can be generated. In embodiments where the speckle images to be compared are separated by a significant period of time (e.g., days, weeks, months or years), variances in ambient temperature at the time of speckle image generation should be taken into account and compensated for, as the deformation of the object or sensor may be affected thus introducing error into the strain calculation.

In one or more embodiments, the second speckle images need only be captured within a range such that image correlation with the first speckle images is achieved. In certain embodiments, when generating the second speckle images, it can be important for the laser light to illuminate the same areas 72 and 73 within a tolerance of 10 mm, 7 mm, 5 mm, 2 mm, or 1 mm of the areas from which the first speckle images are generated. Thus, particularly in those applications in which the sensor needs to be repositioned over areas 72 and 73, care must be taken to ensure proper repositioning of the sensor. In certain embodiments, a user utilizing an optical strain sensor 10 as a handheld device can easily reposition the sensor 10 at or near the areas 72 and 73 to generate second speckle images such that image correlation with the first speckle images is achieved. One skilled in the art can use any type of alignment mechanism so that the second speckle images are generated at or near the areas 72 and 73 of the first speckle images.

In certain embodiments, placing the optical strain sensor adjacent the object 71 to generate the second speckle images can comprise visually aligning a positioning indicium of the optical strain sensor with a corresponding indexing mark on the object 71. The positioning indicium of the optical strain sensor and the corresponding indexing mark on the object 71 can be any materials or components known to one skilled in the art to aid in the alignment of the strain sensor to a particular area on the object 71. For example, in one or more embodiments, the optical strain sensor can include supporting legs that can align with marks on the surface of the object 71 to denote the position of areas 72 and 73 thereby aligning the lasers so that they can illuminate the areas 72 and 73 of the object 71. The marks on the surface can be any type of marks such as, a coating or a dye. In another embodiment, a user can align the sensor with areas 72 and 73 by aligning the laser with a noticeable mark on the surface of the object 71 merely by "eyeballing" the juxtaposition of the object and sensor. In still other embodiments, the object can be provided with an indexing mark comprising a fluorescent material that can be illuminated by UV light. In such embodiments, the optical strain sensor can include a UV-light emitter mounted thereon, which can be pointed at the object 71 so that when the strain sensor is in alignment, the fluorescent material absorbs the UV-light and emits visible light as an alignment signal to the user. In certain other embodiments, the surface of the object 71 can be marked with paint or other coating where a user can position the sensor by aligning a cross-hair laser mounted on the strain sensor with the coated area on the object 71.

In one or more embodiments, when generating the second speckle images, the placement of the optical strain sensor can include utilizing an automated positioning system to ensure that the sensor is positioned relative to the object 71 such that the first area 72 and the second area 73 are illuminated and the second speckle images are generated. The automated positioning system can be any type of positioning system known to one skilled in the art. For example, in certain embodiments a linear traverse, as discussed above, can be used or modified for used as an automated positioning system.

Returning now to FIG. 7, once the speckle images of areas 72 and 73 have been generated in the first condition 71a and the second condition 71b, one can determine the surface strain. By applying a cross-correlation technique to the first and second speckle images for a respective area, e.g., comparing the first speckle image of area 72 to the second speckle image of the area 72, the displacement of the areas 72, ΔA, and 73, ΔB, can be extracted. In certain embodiments, determining the surface strain comprises determining the relative displacement of the first and second areas 72 and 73, respectively, between generation of the first speckle images and said second speckle images. For example, once ΔA and ΔB are extracted one can determine the surface strain between areas 72 and 73 using the formula: $\epsilon=(\Delta B-\Delta A)/L$, where L is the gauge length of the sensor.

In one or more embodiments, a cross-correlation technique is performed in order to determine the surface strain of an object via ΔA and ΔB. For example in certain embodiments, determining the surface strain of an object can include subjecting the first and second speckle images to histogram equalization, reducing the effect of spectral leakage on the speckle images through application of a hanning window, correlating the first and second speckle images using a pyramid scheme downsampling technique, and interpolating sub-pixel resolution for the first and second speckle images. In certain embodiments, determining the surface strain of an object can further include converting the image motion in the units of pixels measured by an imaging device to the corresponding actual object motion. The theory and validation of the aforementioned image processing steps is explained in detail in the Doctoral Thesis of Weixin Zhao, entitled "Development of a Portable Optical Strain Sensor with Applications to Diagnostic Testing of Prestressed Concrete," May 2011, Kansas State University, Manhattan, Kans., USA, incorporated by reference herein.

In certain embodiments, any or all of the above-described procedures can be performed manually or automatically. For example, as described below in the Examples, in certain embodiments, an optical strain sensor in accordance with the present invention can be used to automatically determine the transfer length of a pre-stressed concrete member, that is, the length required to transfer the pre-stress force into the concrete member. In automatic operation, an optical strain sensor in accordance with the present invention can be coupled with one or more processors (e.g., a computer) programmed to carry out operation of the module lasers and image sensors, and complete the analysis of the acquired speckle images as outlined in Zhao.

For example, the embodiment depicted in FIG. 8 includes an automated sensor assembly 11 having an optical strain sensor 12 that can be configured for automated strain measurements. In certain embodiments, the automated sensor assembly 81 includes a computer controlled traverse 83 with an optical strain sensor 82 mounted thereon, thereby providing the capability to automatically traverse the sensor 82 along the transfer length region of an object prior to and after a cutting operation (e.g., before and after de-tensioning) to assess surface strain of the object. In certain embodiments, the automated sensor system 81 can provide the flexibility to easily adjust the spatial sampling frequency of the surface strain measurement to investigate optimal sample scenarios.

As shown in the embodiment of FIG. 8, the automated sensor system 81 can be positioned adjacent a tie cutting operation 86 to take measurements of a pre-stressed concrete railroad tie 84a prior to and after the tie 84a is cut from a combined railroad tie 84 by a cutter 85.

In certain embodiments not depicted in the figures, the automated sensor system 81 can include a laptop computer that provides USB and/or RS232 communications with the traverse system 83 and the sensor 82. In one or more embodiments, the traverse control and data processing can be included in one software package, with the data processing being conducted on the same computer. In such embodiments, the automated sensor system 81 can calculate and plot the surface strain after the raw images are captured.

In one or more embodiments, a transfer length estimation method can be included in the software of the automated sensor system 81. In certain embodiments, the software of the automated sensor system 81 can read the raw images captured by the sensor 82, conduct the necessary data-processing procedures and then report transfer length estimation automatically. The transfer length estimation method ("Zhao-Lee method" or "ZL method") is based on a least-squares technique and provides unbiased estimation of the transfer length. The ZL method turns the transfer length determination problem into a problem to find the optimal location of the intersection point that minimizes a target function, where the target function is generated by assuming the surface strain to be bilinear with the rounding effect of the gauge length of the sensor taken into account. In certain embodiments, the ZL method is able to estimate the transfer length values with a 95% confidence interval narrower than ±1.5 in., when the gauge length is larger than 4.00 in. In other embodiments, the ZL method can estimate transfer length values with greater than a 95% confidence interval.

Optical strain sensors in accordance with the present invention have been observed to produce similar results to a Whittemore gauge and an electronic strain gauge.

EXAMPLES

The use of the optical strain sensor in accordance with certain embodiments of the present invention is discussed in the following Examples. It is to be understood, however, that these Examples are provided by way of illustration and nothing therein should be taken as a limitation upon the overall scope of the invention.

Example 1

Surface Strain Profile of a Pre-Stressed Concrete Member

Figure 9:
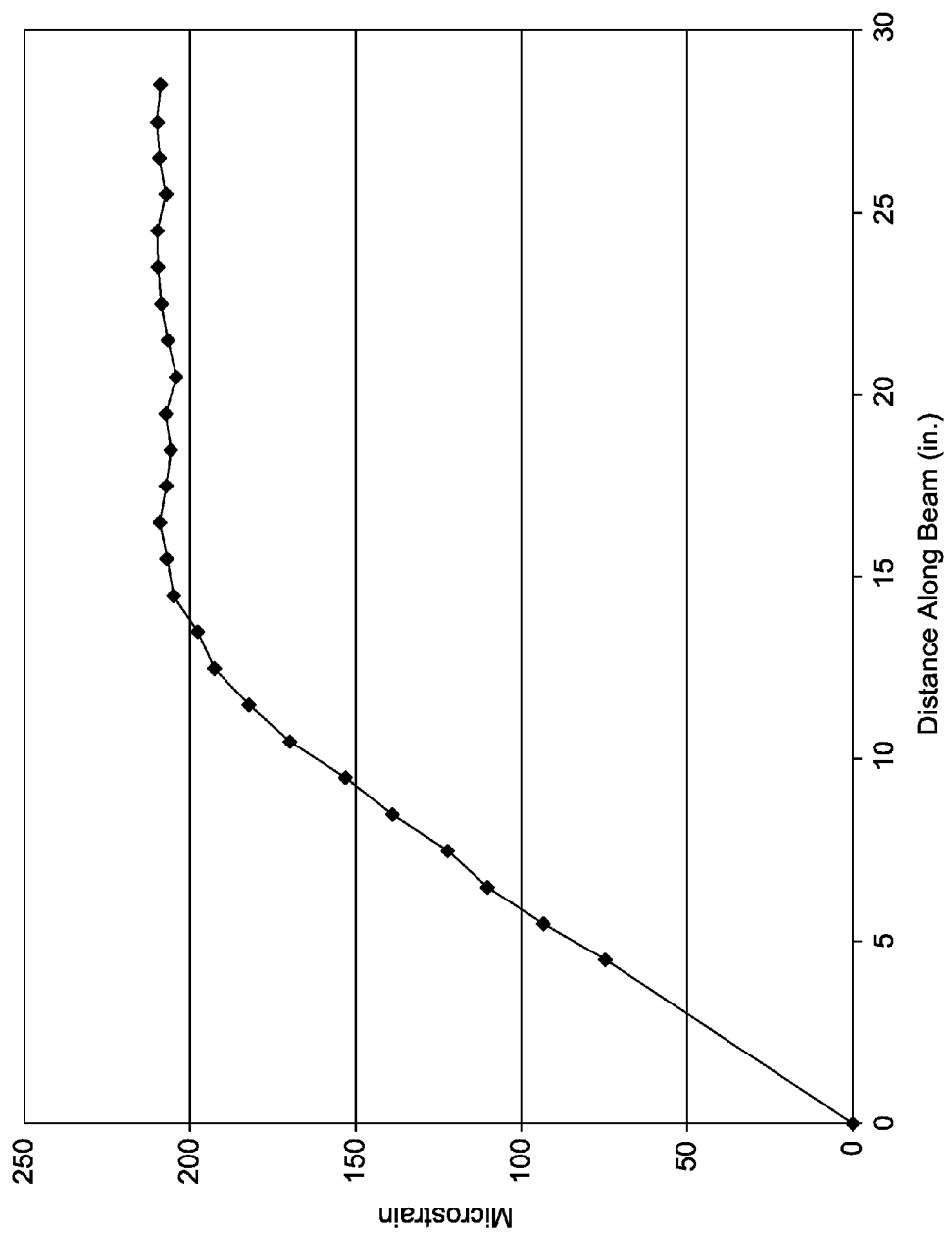
FIG. 9 is a surface strain profile showing the surface strain at varying positions along a pre-stressed concrete beam immediately after de-tensioning.

In this Example, a surface strain profile of a pre-stressed concrete beam immediately after cutting the tensioned strands was generated. A 9.5 foot pre-stressed concrete beam having a rectangular cross section was fabricated around tensioned steel strands. In order to facilitate the strain sensor measurements, three small ¼-inch diameter inserts were cast into the pre-tensioned concrete beam to allow an aluminum rail to sit on the top of the beam surface. The optical strain sensor fabricated in accordance with the present invention was then installed on the rail and was able to traverse freely thereon. Surface strain measurements were obtained at various points along the concrete beam and processed as discussed above. The results are shown graphically in FIG. 9, which illustrate that the optical strain sensor can perform surface strain measurements on pre-stressed concrete beams immediately after de-tensioning. Further, the results reveal that the optical strain sensor exhibits scatter below 10 microstrain.

Example 2

Transfer Length Measurement of Pre-Stress Railroad Tie

In this Example, the feasibility of the in-plant transfer length measurements using the optical strain sensor was determined. Transfer length measurements were obtained at the CXT concrete cross-tie production plant in Grand Island, Nebr.

In order to facilitate the strain sensor measurements, three small ¼-inch-diameter inserts were cast into each of the cross-ties immediately after pouring the concrete mix. The inserts allow an aluminum rail to sit on the top of the member surface. The sensor was installed on the rail and was able to traverse freely thereon.

Before de-tensioning the cross-tie, the optical strain sensor was manually traversed along the rail as sensor readings were taken every 0.5 inch for the first 10 points counting from the end of the tie, and every 1 inch thereafter along the beam. 70 data points were obtained for each tie, with 35 data points for either side.

After the cross-tie was de-tensioned, i.e., the tensioned reinforcing strands were cut and the pre-stress force was transferred to the concrete member, post-de-tensioning readings were taken. The two sets of readings were compared to extract the strain information at each location, which in turn was used to plot the strain profile of the cross-tie for the transfer length determination. To reduce the de-correlation effect, microscopic reflective particles were bonded to the cross-ties to serve as artificial speckle before the initial readings were taken. The particles were much less vulnerable to the severe abrasions encountered in the cross tie plant than the concrete surface itself, thereby increasing the likelihood of a successful speckle images and measurements.

With the microscopic particles applied to the surface of the cross-tie, the strain sensor was able to find the correlation between the corresponding speckle image pairs and extract the surface strain information of the cross-ties. The total time for measuring each tie was about 3 minutes. This was made possible because no high precision traverse setup was required and simple visual manual positioning was adequate for speckle imaging.

Figure 10:
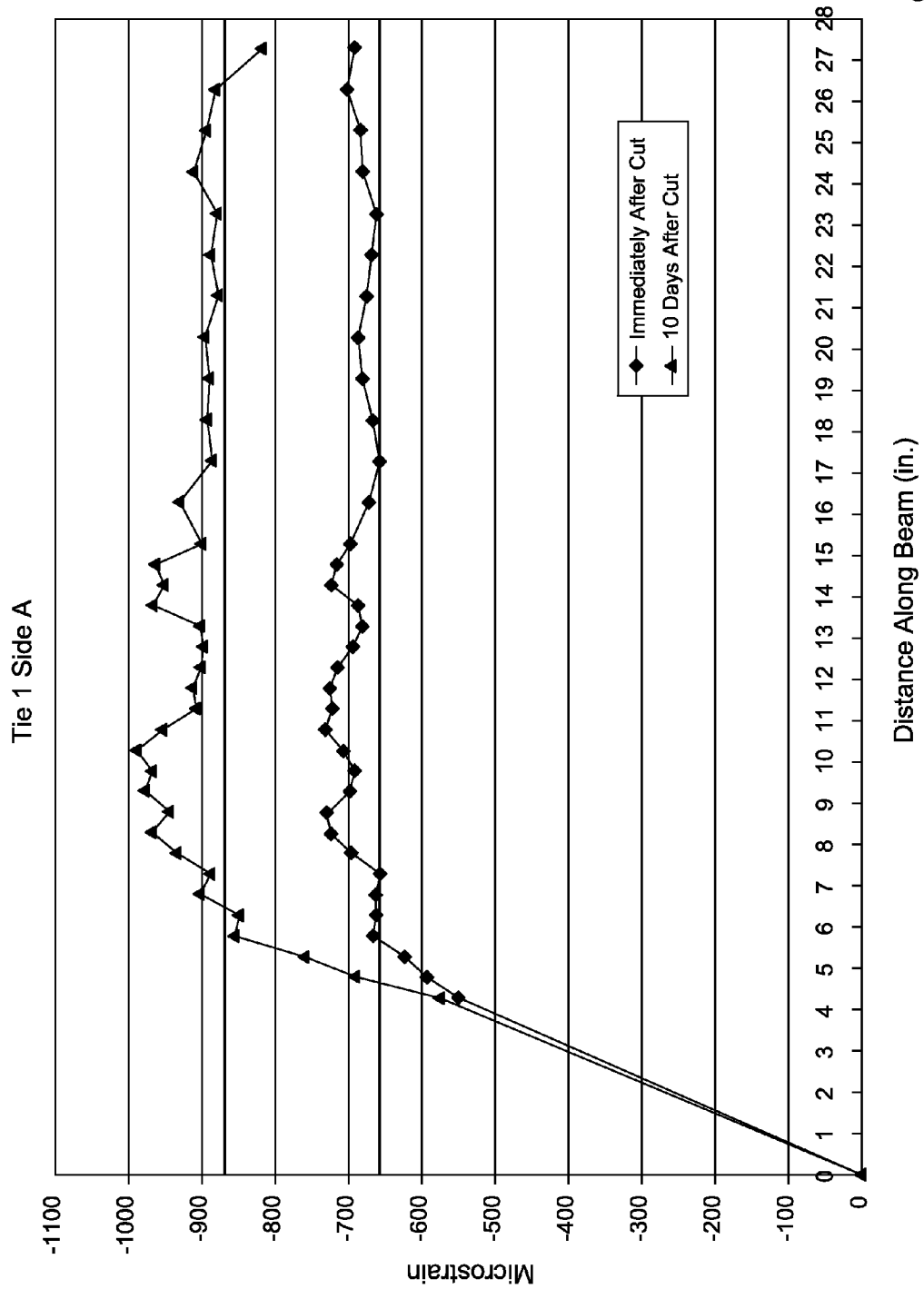
FIG. 10 is a surface strain profile showing the surface strain at varying positions along a pre-stressed railroad tie beginning at one end thereof immediately after de-tensioning and 10 days later.
Figure 11:
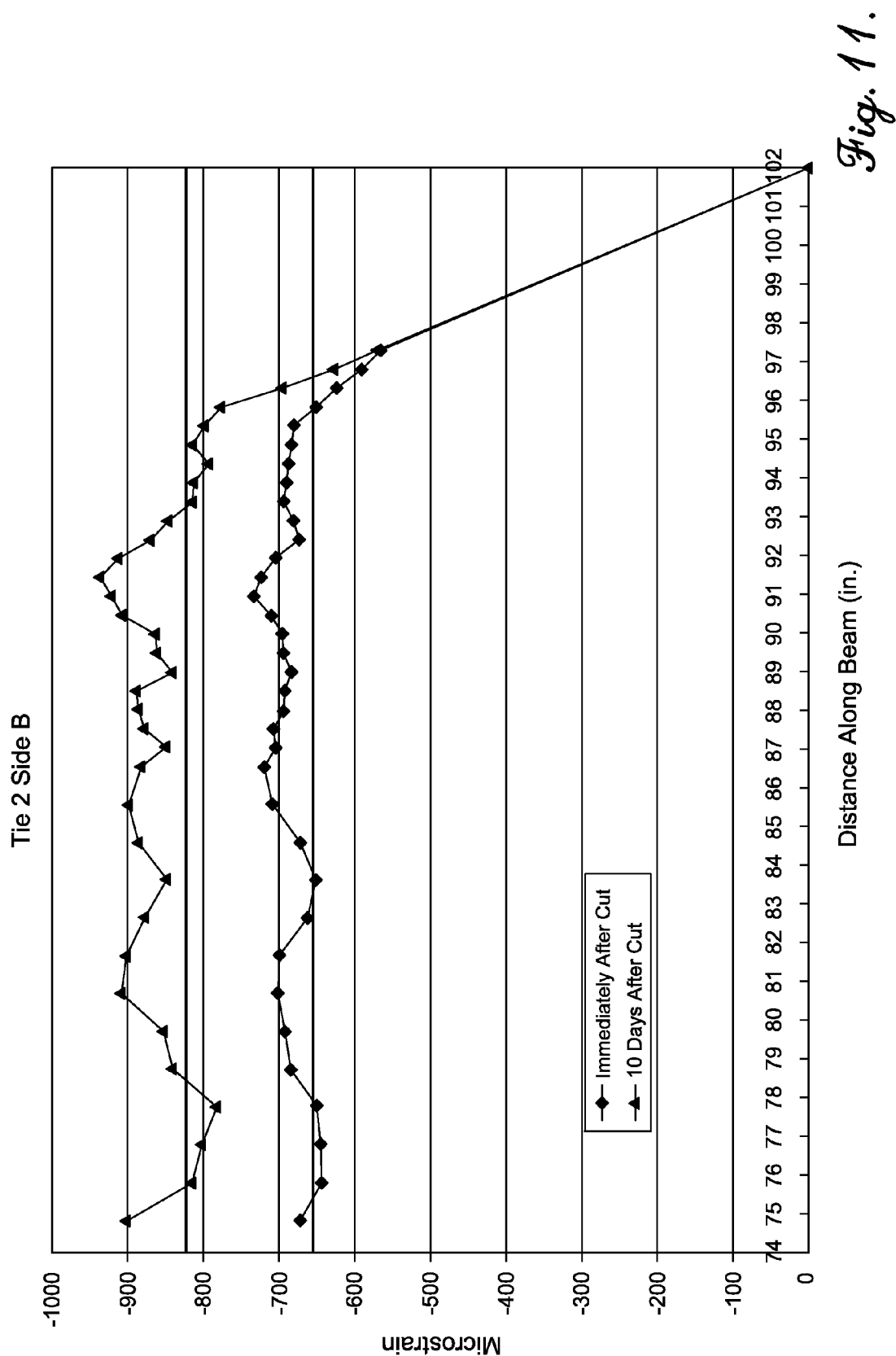
FIG. 11 is a surface strain profile showing the surface strain at varying positions along another pre-stressed railroad tie moving toward the distal end of the tie immediately after de-tensioning and 10 days later.
Figure 12:
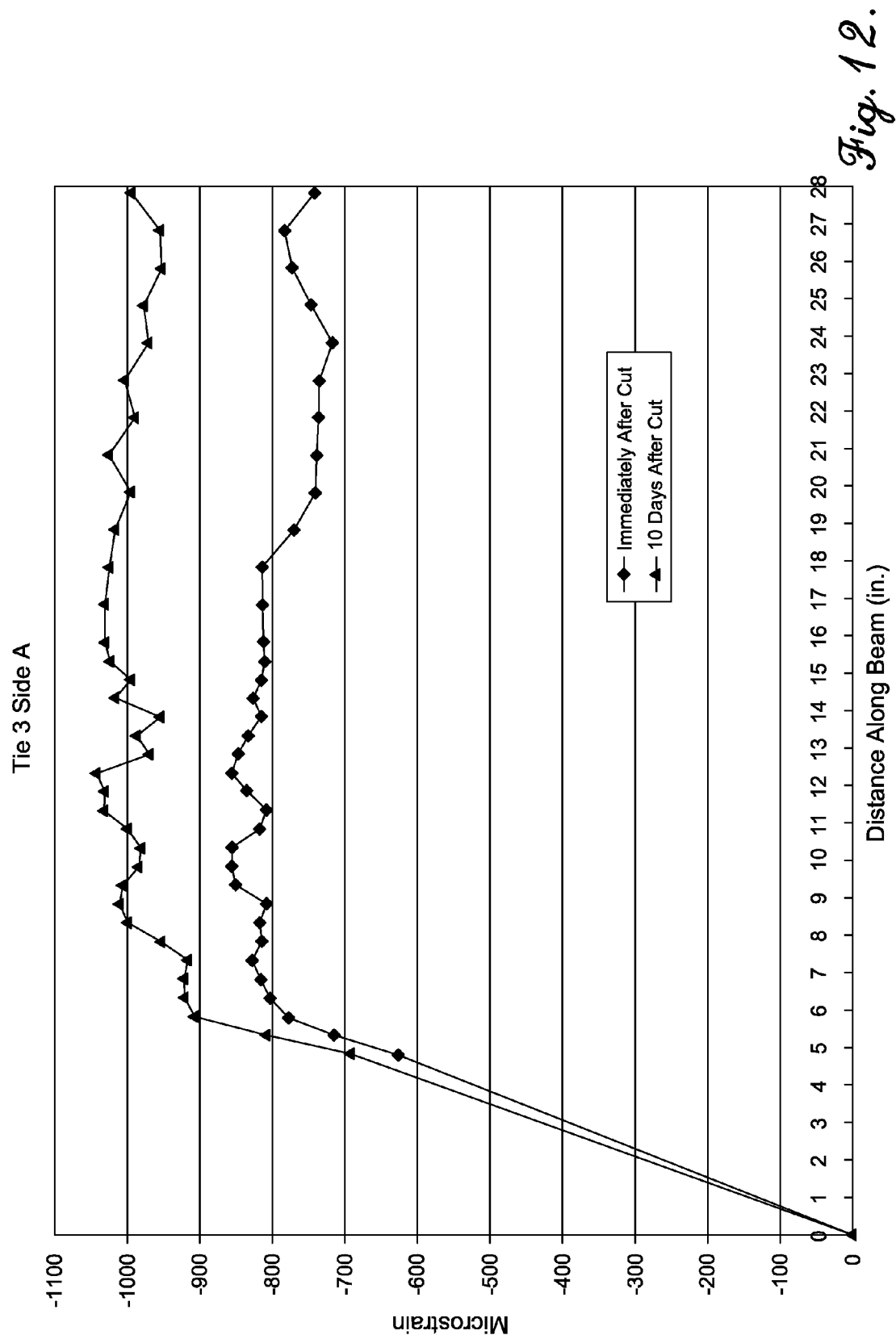
FIG. 12 is a surface strain profile showing the surface strain at varying positions along yet another pre-stressed railroad tie beginning at one end thereof immediately after de-tensioning and 10 days later.

Strain measurements were taken on three different railroad ties right after de-tensioning and 10 days later. The results from the in-plant cross-tie measurements are shown in FIGS. 10-12, and illustrate that the optical strain sensor fabricated in accordance with the present invention was successful at extracting the surface strain information for both short and long term strain readings in a railroad cross tie manufacturing plant.

Example 3

Automated Transfer Length Measurements on Concrete Railroad Ties

In this Example, an automated strain sensor assembly was fabricated as described above with respect to FIG. 8, and utilized to measure transfer lengths of concrete prisms. The specifications of the automated sensor assembly used in this Example includes 24 inch scan length measurement on each end of the concrete cross-tie, 1 minute cycle time for approximately 60 distributed strain measurements per scan, and 0.010 in. repeatable sensor positioning accuracy.

A pre-tensioned concrete prism was poured as the specimen, and after setting, the automated sensor system was mounted on top of the concrete prism surface. The sensor traveled along the concrete prism and took 60 surface strain data points in 1 minute for one end of the concrete prism. By doing this before and after the de-tensioning, the surface strain profile was measured and the transfer length was subsequently reported.

To evaluate the repeatability of the automated sensor system, a total of 8 repetitions of real prism strain data were taken on the same side of the concrete prism. For each repetition, the automated sensor system was repositioned on slightly different location on the prism intentionally, to make sure the 8 repetitions were independent of each other. Table 1 shows the transfer length values obtained from the 8 repetitions. It can be seen that the repeatability of the transfer length measurement by the automated sensor system is very good, with the standard deviation of the transfer length equal to only about 0.2 in. Furthermore, the transfer length of the same concrete prism was measured by using the Whittemore gauge and the result was 9.1 in., showing an excellent agreement between the Whittemore gauge and the automated sensor.

TABLE 1

Transfer lengths measured on a pre-tensioned concrete prism (Unit: in.)

| | | | Repetition # | | | | | |
|---|---|---|---|---|---|---|---|---|
| 1 | 2 | 3 | 4 | 5 | 6 | 7 | 8 | Standard deviation |
| Transfer Length 9.2 | 8.8 | 9.4 | 9.3 | 9.0 | 9.2 | 9.0 | 9.0 | 0.2 |

In this Example, the surface strain was measured by the automated sensor system at 0.5 in. spacing. It is predictable that the higher the spatial sampling frequency of the surface strain data, the more accurate the transfer length can be determined. It is very easy for the automated sensor system to employ different spatial sampling frequency of the surface strain measurement, depending on the specific objective of various applications.

Example 4

Automated Measurements at a Concrete Railroad Tie Plant

In order to verify the capability of the automated sensor system used in Example 3 to measure the transfer length in the industrial environment, transfer length measurements were conducted on railroad ties being produced. Because of the manufacturing process, strain measurements are made on the upward-facing bottom surface of the ties. The surface of the concrete must remain smooth and consistent throughout the measurement process, in order for the optical strain sensor to work properly. Steel bars were placed in the concrete during the time of casting. Once the concrete had cured, the bars were removed and left a smooth surface for the optical strain sensor to take measurements.

Once the base readings (i.e., prior to de-tensioning) are taken on the concrete tie surface, the surface must remain relatively unchanged, otherwise secondary readings of strain cannot be taken. If the surface features are substantially altered after the base readings are made, the speckle pattern will not represent a "fingerprint" for each individual surface feature location. This is a major problem when taking measurements at a pre-stressed concrete tie plant. The plant introduces many factors that can alter the concrete surface structure, such as water used during the cutting operation, dust, handling of the ties by positioning machines and vacuum manipulators, and early release of the pre-stressing force. To avoid this problem, microscopic reflective particles were bonded to the railroad tie surface to serve as an artificial speckle "tag" before the initial readings were taken. The particles were much less vulnerable to the severe abrasions than the concrete surface itself, and helped keep the image correlation that was critical for the strain sensor to be functional in this situation.

Figure 13:
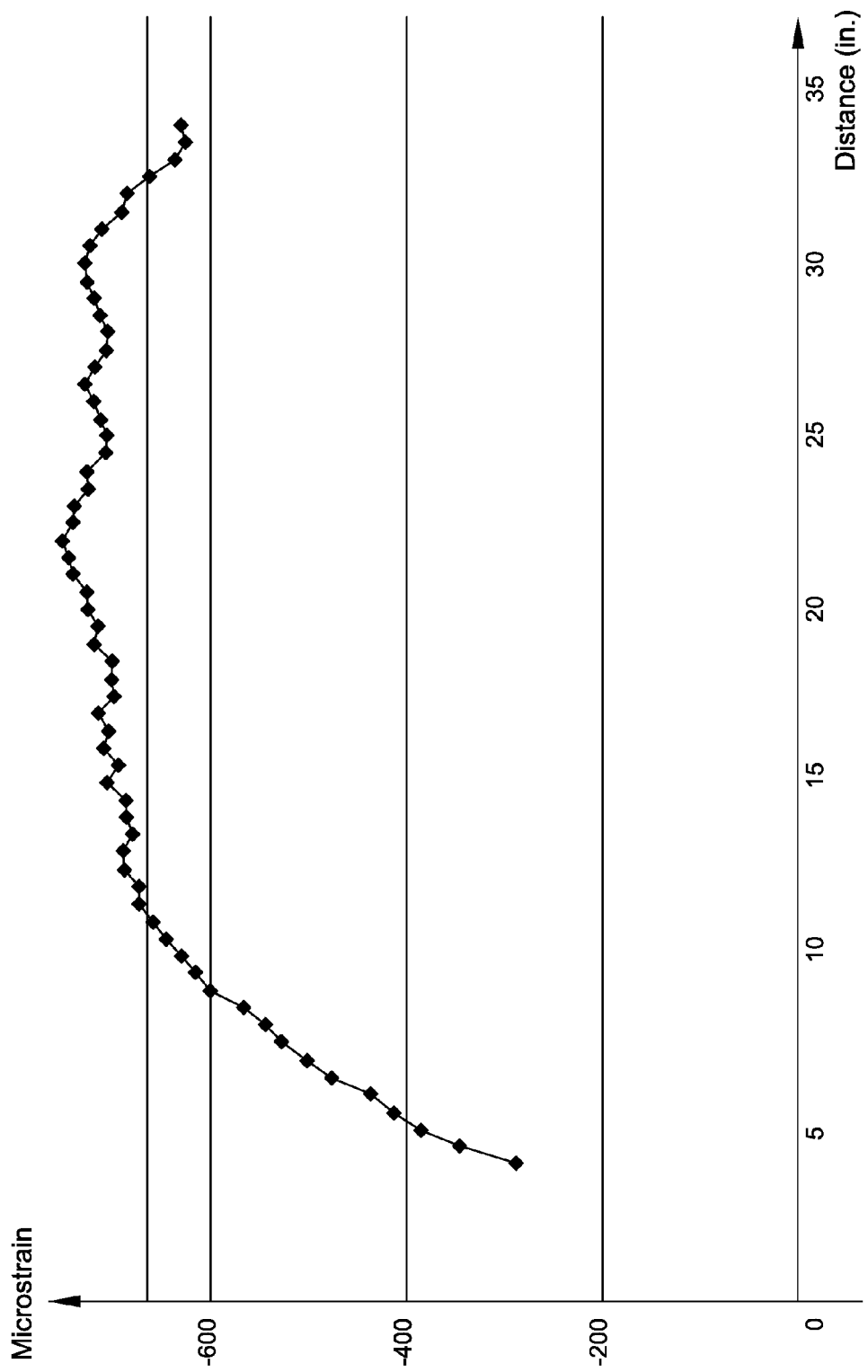
FIG. 13 is a surface strain profile showing the surface strain at varying positions along another pre-stressed railroad tie after de-tensioning.

Before de-tensioning the railroad ties, initial speckle images were taken every 0.5 in. After the railroad tie was de-tensioned and cut, second speckle images were taken. The two sets of images were compared to extract the strain information at each location, as discussed above, which in turn was used to plot the strain profile of the railroad tie for the transfer length determination. The whole procedure was done automatically with the total time for measuring one side of a tie being only about 1 minute. An example of the surface strain profile obtained by using automated sensor system is shown in FIG. 13.

In addition, transfer length measurements on four different combinations of concrete mixes and wire sources from different producers were determined. For comparison purposes, the Whittemore gauge was also used to measure the transfer length of three railroad ties for each casting setting. The raw strain data obtained by the Whittemore gauge was analyzed by the traditional 95% AMS method to estimate the transfer length. For all the 4 castings of the ties, a total of 41 transfer lengths were measured by the automated sensor system, and 12 transfer lengths were measured by the Whittemore gauge. The transfer length results are summarized in FIG. 14. Due the different surface preparations, an individual concrete tie was either measured by the strain sensor or the Whittemore gauge, but not by both. Thus a one-to-one comparison between the two sensors on the same concrete tie is not applicable. Therefore, the transfer lengths measured by the two technologies were plotted in separate columns.

Figure 14:
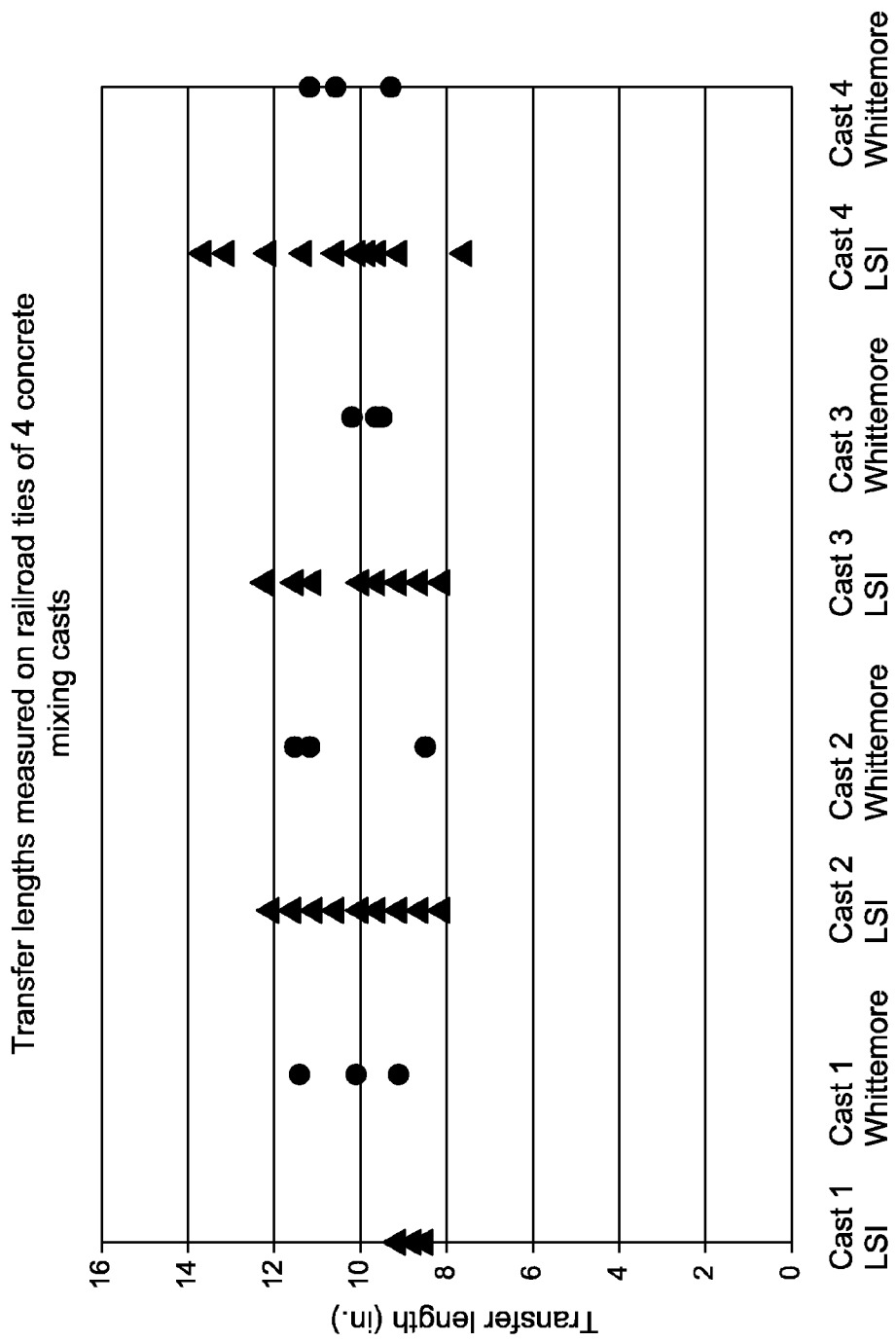
FIG. 14 is a plot of transfer length measurements on railroad ties of four different concrete mixing casts taken with a Whittemore gauge and a strain sensor according to one embodiment of the present invention.

FIG. 14 shows the transfer length values measured by both devices were consistent. The total number of the transfer lengths measured by the automated strain sensor were four times the number obtained using the Whittemore gauge, which reflects the higher operation speed and ease of use of the automated system. In addition, all the transfer length values were observed to be considerably less than a rail seat distance of 21 in., as found on a typical railroad tie.

We claim:

1. An optical strain sensor for detecting strain in an object, said sensor comprising:
   a first module comprising a first laser and a first image sensor, wherein said first module is configured to illuminate a first area on a surface of said object, and capture at least a portion of light reflected off said first area as a speckle image of said first area;
   a second module comprising a second laser and a second image sensor, wherein said second module is configured to illuminate a second area on said surface of said object, spaced apart from said first area, and capture at least a portion of light reflected off said second area as a speckle image of said second area;
   one or more members interconnecting said first and second modules configured to fix the length between said first and second modules and define a gauge length corresponding to the distance between said first and second areas; and a linear traverse, said first and second modules being shiftably mounted upon said linear traverse to permit translatory movement of said modules while said gauge length remains fixed.

2. The optical strain sensor according to claim 1, wherein each of said first and second image sensors is a CCD sensor.

3. The optical strain sensor according to claim 1, wherein said first and second modules are configured to simultaneously capture said speckle images of said first and second areas.

4. The optical strain sensor according to claim 1, wherein said first module further comprises a first beam splitter operable to split light emitted by said first laser prior illumination of said first area, and wherein said second module further comprises a second beam splitter operable to split light emitted by said second laser prior to illumination of said second area.

5. The optical strain sensor according to claim 4, wherein said first laser, said first image sensor, and said first beam splitter are rigidly coupled so that their relative positions are fixed within said first module, and wherein said second laser, said second image sensor, and said second beam splitter are rigidly coupled so that their relative positions are fixed within said second module.

6. The optical strain sensor according to claim 1, wherein said one or more members interconnecting said first and second modules are configured to permit adjustment of the length between said first and second modules thereby altering the gauge length.

7. The optical strain sensor according to claim 1, wherein said one or more members interconnecting said first and second modules comprise a carbon fiber material.

8. The optical strain sensor according to claim 1, wherein said one or more members interconnecting said first and second modules has a thermal expansion coefficient of less than $7.3 \times 10^{-6}$ in./in./° F.

9. The optical strain sensor according to claim 1, wherein each of said first and second lasers comprises a laser diode.

10. The optical strain sensor according to claim 1, wherein said first and second modules and said one or more members are enclosed in a housing.

11. The optical strain sensor according to claim 1, wherein said sensor is a portable, hand-held device.

12. The optical strain sensor according to claim 1, wherein said sensor further includes a third module comprising a third laser and a third image sensor, said third module being configured to illuminate a third area on the surface of said object, and capture at least a portion of light reflected off said third area as a speckle image of said third area, said third module being interconnected with at least one of said first and second modules by one of said members.

13. The optical strain sensor according to claim 12, wherein said first, second, and third modules are arranged in a rosette geometrical configuration, said sensor being operable to measure 2-dimensional strain.

14. The optical strain sensor according to claim 12, wherein said first, second, and third modules are arranged in a substantially co-linear configuration.

15. The optical strain sensor according to claim 12, wherein said sensor further includes a fourth module comprising a fourth laser and a fourth image sensor, said fourth module being configured to illuminate a fourth area on the surface of said object, and capture at least a portion of light reflected off said fourth area as a speckle image of said fourth area, said fourth module being interconnected with at least one of said first, second, and third modules by one of said members.

16. The optical strain sensor according to claim 15, wherein said first and second sensors comprise a first dual-strain module assembly, and said third and fourth members comprise a second dual-strain module assembly, said first and second assemblies comprise substantially equivalent gauge lengths, said first assembly being stacked on top of said second assembly such that said first module is positioned directly above said third module, and said second module is positioned directly above said fourth module, said sensor being configured for bi-axial strain measurement.

17. The optical strain sensor according to claim 1, wherein said object comprises concrete, metal, and/or fiberglass.

18. A method of sensing strain in an object comprising:
(a) placing an optical strain sensor adjacent an object so that an optical strain measurement can be taken, said sensor comprising
  a first module comprising a first laser and a first image sensor, wherein said first module is configured to illuminate a first area on a surface of said object, and capture at least a portion of light reflected off said first area as a speckle image of said first area;
  a second module comprising a second laser and a second image sensor, wherein said second module is configured to illuminate a second area on said surface of said object, spaced apart from said first area, and capture at least a portion of light reflected off said second area as a speckle image of said second area; and
  one or more members interconnecting said first and second modules configured to fix the length between said first and second modules and define a gauge length corresponding to the distance between said first and second areas;
(b) using said optical strain sensor to illuminate a first area and a second area on a surface of said object and to capture at least a portion of light emitted from said sensor and reflected off said object thereby generating an initial speckle image of said first area and an initial speckle image of said second area, said initial speckle images being representative of an first condition of said object;
(c) separating said optical strain sensor from said object;
(d) after passage of a predetermined length of time, visually aligning a positioning indicium of said optical strain sensor or another optical strain sensor according to step (a) with a corresponding indexing mark on said object and placing said optical strain sensor or said other optical strain sensor adjacent said object to illuminate said first and second areas of said surface of said object and to capture at least a portion of light emitted from said sensor and reflected off said object thereby generating a second speckle image of said first area and a second speckle image of said second area, said second speckle images being representative of a second condition of said object; and
(e) comparing said initial speckle images to said second speckle images to determine a strain measurement.

19. The method according to claim 18, wherein said first and second conditions of said object comprise different stress conditions of said object.

20. The method according to claim 19, wherein said first condition of said object comprises a condition in which said object is subjected to stress, and said second condition of said object comprises a condition in which said stress has been reduced.

21. The method according to claim 20, wherein said object is a pre-stressed concrete article.

22. The method according to claim 18, wherein said method comprises, prior to step (b), applying a material to at least a portion of said object so as to produce a more uneven object surface thereby assisting in acquisition of said speckle images.

23. The method according to claim 22, wherein said material comprises microscopic reflective particles.

24. The method according to claim 22, wherein said material comprises a paint having solid particles suspended therein.

25. The method according to claim 18, wherein step (e) comprises determining the relative displacement of said first and second areas between generation of said first speckle images and said second speckle images.

26. The method according to claim 18, wherein step (e) comprises subjecting said first and second speckle images to histogram equalization, reducing the effect of spectral leakage on said speckle images through application of a hanning window, correlating said first and second speckle images using a pyramid scheme downsampling technique, and interpolating sub-pixel resolution for said first and second speckle images.

27. An optical strain sensor for detecting strain in an object, said sensor comprising:
a first module comprising a first laser and a first image sensor, wherein said first module is configured to illuminate a first area on a surface of said object, and capture at least a portion of light reflected off said first area as a speckle image of said first area;
a second module comprising a second laser and a second image sensor, wherein said second module is configured to illuminate a second area on said surface of said object, spaced apart from said first area, and capture at least a portion of light reflected off said second area as a speckle image of said second area;
one or more members interconnecting said first and second modules configured to fix the length between said first and second modules and define a gauge length corresponding to the distance between said first and second areas; and
a third module comprising a third laser and a third image sensor, wherein said third module is configured to illuminate a third area on the surface of said object, and capture at least a portion of light reflected off said third area as a speckle image of said third area, said third module being interconnected with at least one of said first and second modules by one of said members, said first, second, and third modules being arranged in a rosette geometrical configuration, whereby said sensor is operable to measure 2-dimensional strain.

28. An optical strain sensor for detecting strain in an object, said sensor comprising:
a first module comprising a first laser and a first image sensor, wherein said first module is configured to illuminate a first area on a surface of said object, and capture at least a portion of light reflected off said first area as a speckle image of said first area;
a second module comprising a second laser and a second image sensor, wherein said second module is configured to illuminate a second area on said surface of said object, spaced apart from said first area, and capture at least a portion of light reflected off said second area as a speckle image of said second area;
one or more members interconnecting said first and second modules configured to fix the length between said first and second modules and define a gauge length corresponding to the distance between said first and second areas; and
a third module comprising a third laser and a third image sensor, wherein said third module is configured to illuminate a third area on the surface of said object, and capture at least a portion of light reflected off said third area as a speckle image of said third area, said third module being interconnected with at least one of said first and second modules by one of said members, said first, second, and third modules being arranged in a substantially co-linear configuration.

29. An optical strain sensor for detecting strain in an object, said sensor comprising:
a first dual-strain module assembly comprising
a first module comprising a first laser and a first image sensor, wherein said first module is configured to illuminate a first area on a surface of said object, and capture at least a portion of light reflected off said first area as a speckle image of said first area,
a second module comprising a second laser and a second image sensor, wherein said second module is configured to illuminate a second area on said surface of said object, spaced apart from said first area, and capture at least a portion of light reflected off said second area as a speckle image of said second area,
one or more members interconnecting said first and second modules configured to fix the length between said first and second modules and define a gauge length corresponding to the distance between said first and second areas;
a second dual-strain module assembly comprising
a third module comprising a third laser and a third image sensor, wherein said third module is configured to illuminate a third area on the surface of said object, and capture at least a portion of light reflected off said third area as a speckle image of said third area, said third module being interconnected with at least one of said first and second modules by one of said members,
a fourth module comprising a fourth laser and a fourth image sensor, wherein said fourth module is configured to illuminate a fourth area on the surface of said object, and capture at least a portion of light reflected off said fourth area as a speckle image of said fourth area, said fourth module being interconnected with at least one of said first, second, and third modules by one of said members,
said first and second assemblies comprising substantially equivalent gauge lengths, said first assembly being stacked on top of said second assembly such that said first module is positioned directly above said third module, and said second module is positioned directly above said fourth module, whereby said sensor is configured for bi-axial strain measurement.

30. A method of sensing strain in an object comprising:
(a) placing an optical strain sensor adjacent an object so that an optical strain measurement can be taken, said sensor comprising
a first module comprising a first laser and a first image sensor, wherein said first module is configured to illuminate a first area on a surface of said object, and capture at least a portion of light reflected off said first area as a speckle image of said first area;
a second module comprising a second laser and a second image sensor, wherein said second module is configured to illuminate a second area on said surface of said object, spaced apart from said first area, and capture at least a portion of light reflected off said second area as a speckle image of said second area; and one or more members interconnecting said first and second modules configured to fix the length between said first and second modules and define a gauge length corresponding to the distance between said first and second areas;

(b) using said optical strain sensor to illuminate a first area and a second area on a surface of said object and to capture at least a portion of light emitted from said sensor and reflected off said object thereby generating an initial speckle image of said first area and an initial speckle image of said second area, said initial speckle images being representative of an first condition of said object;

(c) separating said optical strain sensor from said object;

(d) after passage of a predetermined length of time, utilizing an automated positioning system to ensure that said optical strain sensor or another optical strain sensor according to step (a) is positioned and placed relative to said object such as to illuminate said first and second areas of said surface of said object and to capture at least a portion of light emitted from said sensor and reflected off said object thereby generating a second speckle image of said first area and a second speckle image of said second area, said second speckle images being representative of a second condition of said object; and (e) comparing said initial speckle images to said second speckle images to determine a strain measurement.

* * * * *